United States Patent
Kobayashi et al.

(10) Patent No.: US 6,852,375 B2
(45) Date of Patent: Feb. 8, 2005

(54) PREPARATION METHOD OF CHIRAL NEMATIC LIQUID CRYSTAL COMPOSITION AND LIQUID CRYSTAL DISPLAY

(75) Inventors: Nobuyuki Kobayashi, Kobe (JP); Noboru Ueda, Kyoto (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/394,615

(22) Filed: Mar. 21, 2003

(65) Prior Publication Data
US 2003/0183805 A1 Oct. 2, 2003

(30) Foreign Application Priority Data
Mar. 27, 2002 (JP) .................................. 2002-088244

(51) Int. Cl.⁷ .................... C09K 19/58; C09K 19/52; G02F 1/13
(52) U.S. Cl. .................. 428/1.3; 428/1.1; 252/299.01; 349/78; 349/175; 349/176; 349/185
(58) Field of Search .............. 428/1.1, 1.3; 252/299.01, 252/299.2, 299.7; 349/175, 176, 185, 78

(56) References Cited

U.S. PATENT DOCUMENTS

| | | | |
|---|---|---|---|
| 4,780,240 A | 10/1988 | Emoto et al. | 252/299.6 |
| 5,114,614 A | 5/1992 | Emoto et al. | 252/299.65 |
| 6,015,507 A | 1/2000 | Kobayashi et al. | 252/299.01 |
| 6,274,208 B1 | 8/2001 | Iwamatsu et al. | 428/1.1 |
| 6,278,505 B1 | 8/2001 | Okada et al. | 349/78 |
| 6,338,883 B1 | 1/2002 | Iwamatsu et al. | 428/1.1 |
| 6,348,961 B2 | 2/2002 | Iwamatsu et al. | 349/175 |
| 6,552,756 B1 * | 4/2003 | Kotani et al. | 349/20 |
| 6,599,589 B1 * | 7/2003 | Iwamatsu et al. | 428/1.1 |
| 6,618,103 B2 * | 9/2003 | Hisamitsu et al. | 349/78 |

FOREIGN PATENT DOCUMENTS

| | | |
|---|---|---|
| DE | 40 07 039 A1 | 10/1990 |
| EP | 0 218 132 A1 | 4/1987 |
| JP | 11-255675 A | 9/1999 |
| WO | WO 90/11547 A1 | 10/1990 |
| WO | WO 02/099009 A1 | 12/2002 |

* cited by examiner

Primary Examiner—Shean C. Wu
(74) Attorney, Agent, or Firm—Sidley Austin Brown & Wood LLP

(57) ABSTRACT

The present invention is based on a chiral nematic liquid crystal composition which shows cholesteric liquid crystal phase and be able to reflect light in visible region selectively, comprising:

a nematic liquid crystal material;

a first chiral material with shift direction of selective reflection wavelength toward long wavelength direction depending on temperature;

and a second chiral material with shift direction of selective reflection wavelength toward short wavelength direction depending on temperature;

wherein at least one chiral material between the first chiral material and the second chiral material comprises two or more chiral compounds, and relates to a preparation method of the above chiral nematic liquid crystal composition and a (layered-type) liquid crystal display using the same.

20 Claims, 3 Drawing Sheets

PREPARATION METHOD OF CHIRAL NEMATIC LIQUID CRYSTAL COMPOSITION AND LIQUID CRYSTAL DISPLAY

This application is based on application(s) No.2002-088244 filed in Japan, the contents of which are hereby incorporated by reference.

BACKGROUND OF THE INVENTION

1. Field of the Invention

The present invention relates to a preparation method of chiral nematic liquid crystal composition containing nematic liquid crystal material and (stacked) liquid crystal display.

2. Description of the Related Art

A liquid crystal device is basically constituted by a pair of substrates with transparent electrodes and a liquid crystal layer between the substrates. Driving voltage is applied to the liquid crystal layer to control alignment of liquid crystal molecules, so that incident light into device is modulated to display aimed images.

Various systems for liquid crystal display have been proposed. For example, liquid crystal display devices using chiral nematic liquid crystal composition have been studied, in which the chiral nematic liquid crystal composition is prepared to show cholesteric phase at room temperature and selective reflection in visible region. Such liquid crystal display device utilizes the fact that chiral nematic liquid crystal makes selective reflection of light having a specific wavelength and is well known as a liquid crystal device of reflection-type characterized by low power consumption. The display is made by switching liquid crystal conditions between planar state (colored state) and focal conic state (transparent state) by applying high and low pulse voltage. Even after the application of pulse voltage is stopped, the planar state and the focal conic state are kept (this property is called "memorizability").

However, when just adjustment of chiral nematic liquid crystal composition is made so that cholesteric phase at room temperature and selective reflection in visible region can be shown, the following problems arise from the viewpoint of practical use.

The trial has been made to put a stacked liquid crystal device using additive color mixing in practical use so that a full color liquid crystal device can be realized. The stacked liquid crystal display device is generally constituted by a liquid crystal display device for displaying red color, a liquid crystal display device for displaying green color, and a liquid crystal display device for displaying blue color, each display for displaying each color being set up so that selective reflection of light of specified wavelength might be carried out.

Because the wavelength of selective reflection set up in each liquid crystal device shifts depending on change of circumference environment, especially ambient temperature, such a problem arises that light of specified wavelength is not reflected selectively and that desired color can not be realized.

From the viewpoint of decrease of production cost of stacked liquid crystal device, it is advantageous that driving power supply of each liquid crystal device is made common. Therefore, it is necessary to make driving properties (responsibility), especially threshold voltage, of each liquid crystal device approximate. In order to make driving properties approximate, it is necessary that anisotropy of dielectric constant of liquid crystal composition in each liquid crystal device is made approximate. It is known that anisotropy of dielectric constant of liquid crystal composition depending on an amount of addition of chiral material. However, when it is tried to adjust anisotropy of dielectric constant to a specified value only by amount of addition of chiral materials, there arises such a problem as selective reflection wavelength adjusted in liquid crystal composition shifts greatly from a predetermined value. Thus, in the conventional technology, a dielectric constant anisotropy was not able to be adjusted effectively, securing predetermined selective reflection wavelength.

When liquid crystal devices are continuously produced, there exists in general variability in manufacturing conditions caused by variability of composition in lot of materials constituting chiral nematic liquid crystal composition, such as nematic liquid crystal materials and chiral materials. Such variability of composition in lot of materials constituting chiral nematic liquid crystal composition causes variability of anisotropy of dielectric constant in the obtained liquid crystal compositions. The variability of anisotropy of dielectric constant and the variability of manufacturing conditions cause particularly variability of driving voltage in each liquid crystal devices constituting a stacked liquid crystal device. When each liquid crystal device constituting the stacked liquid crystal device is produced, it becomes necessary to adjust anisotropy of dielectric constant of liquid crystal composition in accordance with the above variability whenever conditions of cells or lots of liquid crystal composition materials change, so that driving properties of each liquid crystal device may be made approximate. However, as anisotropy of dielectric constant can not be effectively adjusted while securing a predetermined selective reflection wavelength as described above, it has been difficult to make driving power supply common in the stacked liquid crystal device.

SUMMARY OF THE INVENTION

The present invention is to provide a preparation method of chiral nematic liquid crystal composition in which anisotropy of dielectric constant can be adjusted easily to a desired value while securing excellent temperature compensation (shift of selective reflection wavelength caused by change of ambient temperature can be controlled) and predetermined selective reflection wavelength.

The present invention is also provide a chiral nematic liquid crystal composition and a liquid crystal device, in which shift of selective reflection wavelength caused by change of ambient temperature can be suppressed thereby, a predetermined selective reflection wavelength can be given, and anisotropy of dielectric constant is easily adjusted to a desired value.

The present invention is also provide a stacked liquid crystal device in which each driving power supply in each liquid crystal device is made common and production cost is reduced.

The present invention is based on a chiral nematic liquid crystal composition which shows cholesteric liquid crystal phase and be able to reflect light in visible region selectively, comprising:

a nematic liquid crystal material;
a first chiral material with shift direction of selective reflection wavelength toward long wavelength direction depending on temperature; and
a second chiral material with shift direction of selective reflection wavelength toward short wavelength direction depending on temperature;

wherein at least one chiral material between the first chiral material and the second chiral material comprises two or more chiral compounds.

The present invention also relates to a preparation method of the above chiral nematic liquid crystal composition and a (stacked) liquid crystal display using the same.

BRIEF DESCRIPTION OF THE DRAWINGS

FIG. 1(A) shows a planar state. FIG. 1(B) shows a focal conic state.

DETAILED DESCRIPTION OF THE INVENTION

Figure 1A:
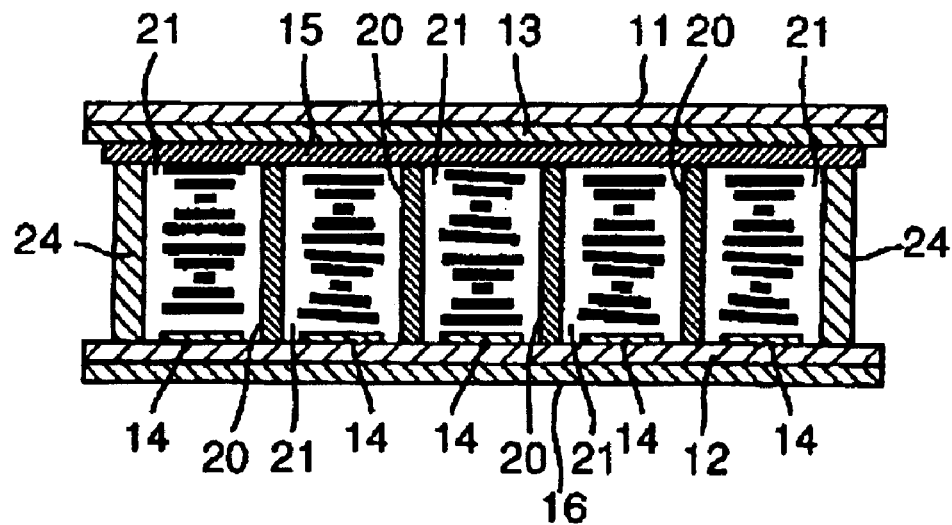
FIG. 1(A) and FIG. 1(B) are schematic sectional views as examples of liquid crystal device of the present invention.

The present invention provides a preparation method of a chiral nematic liquid crystal composition which shows cholesteric liquid crystal phase and be able to reflect light in visible region selectively, the composition containing at least a nematic liquid crystal material, a first chiral material with shift direction of selective reflection wavelength toward long wavelength direction depending on temperature and a second chiral material with shift direction of selective reflection wavelength toward short wavelength direction depending on temperature, wherein, to set anisotropy of dielectric constant of whole chiral nematic liquid crystal composition to a predetermined value, at least one chiral material between the first chiral material and the second chiral material comprises two or more chiral compounds and a mixing ratio of the two or more chiral compounds is controlled, and/or the nematic liquid crystal material comprises two or more kinds of nematic liquid crystal compounds and a mixing ratio of the two or more nematic liquid crystal compounds is controlled.

The present invention also provides a chiral nematic liquid crystal composition prepared according to the above described method, and a liquid crystal device with said chiral nematic liquid crystal composition put and held between a pair of substrates, and a stacked liquid crystal device with two or more liquid crystal devices stacked.

In the present invention, selective reflection wavelength means wavelength of a peak showing highest reflectance when the correlation diagram of a wavelength (horizontal axis)-reflectance (vertical axis) is made up.

A chiral nematic liquid crystal composition of the present invention may be prepared by a method A and/or a method B.

First of all, the method A is described in detail below.

In the method A, a nematic liquid crystal material, a first chiral material with shift direction of selective reflection wavelength toward long wavelength direction depending on temperature and a second chiral material with shift direction of selective reflection wavelength toward short wavelength direction depending on temperature are mixed, wherein at least one chiral material between the first chiral material and the second chiral material comprises two or more chiral compounds.

In accordance with the method A, when a ratio of the two or more chiral compounds contained in at least one chiral material between the first chiral material and the second chiral material is adjusted, predetermined selective reflection wavelength can be secured and anisotropy of dielectric constant of whole liquid crystal composition can be easily adjusted to a desired value without big change of the ratio of total content of the first chiral material and the second chiral material to whole amount of the liquid crystal composition. Excellent temperature compensation property of selective reflection wavelength can be secured by adjusting the ratio of the first chiral material and the second chiral material within a predetermined range.

The nematic liquid crystal material used in the method A, any nematic liquid crystal material known in the field of liquid crystal devices may be used as long as it can give a chiral nematic liquid crystal composition that shows a cholesteric phase at room temperature and is capable of reflecting light selectively in visible region. For example, liquid crystalline ester compounds, liquid crystalline pyrimidines, liquid crystalline cyanobiphenyl compounds, liquid crystalline phenylcyclohexane compounds, liquid crystalline polycyclic compounds, liquid crystalline tolan compounds, liquid crystalline difluorostilbene, and other liquid crystalline compounds having a polar group such as fluorine atom, fluoroalkyl group and cyano group may be used alone or in combination. Among the nematic liquid crystal materials, it is preferable to use such nematic liquid crystal materials as having positive anisotropy of dielectric constant. When the nematic liquid crystal material is a mixture, the mixture should have positive anisotropy of dielectric constant as a whole.

Anisotropy of dielectric constant means a value ($\Delta\epsilon$) (25° C.) which subtracted dielectric constant in the direction perpendicular to symmetry axis from dielectric constant in the direction of symmetry axis in a liquid crystal sample having uniaxial symmetry. In the present specification, a value measured at 25° C. by LCR meter 4192 (available from Hewlett-Packard Japan Ltd.) is used as anisotropy of dielectric constant. The anisotropy of dielectric constant is not necessarily to be measured by LCR meter. Any measuring device may be used as long as anisotropy of dielectric constant can be measured.

As to nematic liquid crystal materials used in the embodiment of the present invention, a mixture of plural liquid crystalline compounds is generally used. For example, ZLI1565 ($\Delta\epsilon$: 7.0), ZLI2248 ($\Delta\epsilon$: 7.4), E44 ($\Delta\epsilon$: 16.8) (each available from Merck Ltd., Japan) may be available on the market as a product having preferable positive anisotropy of dielectric constant. The nematic liquid crystal material may be used in combination with two or more kinds of nematic liquid crystal mixtures.

The chiral materials used in the embodiment of the present invention is to be used to make the liquid crystal materials show cholesteric phase at room temperature and to make light reflect selectively by adding chiral materials to nematic liquid crystal materials. In detail, molecules in the nematic liquid crystal materials are made to form lamellar helical structure (molecular structure with liquid crystal molecules rotated 360° along helical structure of liquid crystal molecules) at room temperature Such chiral materials have such properties that when they are mixed with nematic liquid crystal materials and temperature of the mixture is raised, selective reflection wavelength is made to shift toward either long wavelength direction or short wavelength direction on the basis of selective reflection wavelength of the mixture shown before temperature is raised. In the present specification, such a shift direction toward long wavelength direction or short wavelength direction is "shift direction of selective reflection wavelength depending on temperature."

"With direction of selective reflection wavelength toward long wavelength direction depending on temperature" means such properties that after nematic liquid crystal materials are added with chiral materials at an amount sufficient enough to show cholesteric liquid crystal phase at 25° C., selective reflection wavelength of the mixture is made to shift by 1 nm or more toward long wavelength direction when temperature of the mixture is raised from 25° C. to 60° C. on the basis of selective reflection wavelength of the mixture shown before temperature is raised.

"With direction of selective reflection wavelength toward short wavelength direction depending on temperature" means such properties that after nematic liquid crystal materials are added with chiral materials at an amount sufficient enough to show cholesteric liquid crystal phase at 25° C., selective reflection wavelength of the mixture is made to shift by 1 nm or more toward short wavelength direction when temperature of the mixture is raised from 25° C. to 60° C. on the basis of selective reflection wavelength of the mixture shown before temperature is raised.

In the present invention, a chiral material with shift direction of selective reflection wavelength toward long wavelength direction depending on temperature (referred to as "first chiral material" in the present specification) and a chiral material with shift direction of selective reflection wavelength toward short wavelength direction depending on temperature (referred to as "second chiral material" in the present specification) are used in combination, and at least one chiral material of the first chiral material and the second chiral material contains two or more kinds of chiral compounds. That is, any of the following cases may be applicable to the present invention:

(i) two or more kinds of chiral compounds contained in the first chiral material and one kind of chiral compound contained in the second chiral material;

(ii) one kind of chiral compounds contained in the first chiral material and two or more kinds of chiral compounds contained in the second chiral material; and (iii) two or more kinds of chiral compounds contained in the first chiral material and two or more kinds of chiral compounds contained in the second chiral material.

"Two or more kinds" means "two or more chiral compounds which express each other different anisotropy of dielectric constant in liquid crystal composition when each chiral compound is added into a nematic liquid crystal material." In more detail, when respective chiral compound of two or more kinds of chiral compounds is added at same temperature and at same concentration to prepare a respective liquid crystal composition (mixture) which expresses different anisotropy of dielectric constant each other, those chiral compounds are different each other in "anisotropy of dielectric constant expressed in liquid crystal composition when added into nematic liquid crystal materials." The "anisotropy of dielectric constant expressed in liquid crystal composition when a chiral material (compound) is added into nematic liquid crystal materials" refers to just "expressing anisotropy of dielectric constant" hereinafter.

Anisotropy of dielectric constant of whole liquid crystal composition is adjusted by use of two or more kinds of chiral compounds having different expressing anisotropy of dielectric constant. Two or more kinds of chiral compounds preferably comprise a pair of an increasing-type chiral compound (chiral compound which increase anisotropy of dielectric constant of liquid crystal composition when added into nematic liquid crystal material) and a decreasing-type chiral compound (chiral compound which decrease anisotropy of dielectric constant of liquid crystal composition when added into nematic liquid crystal material). When at least the increasing-type chiral compound and the decreasing-type chiral compound are used as at least one chiral material between the first chiral material and the second chiral material, anisotropy of dielectric constant of whole liquid crystal composition can be easily made high by increasing a ratio of the increasing-type chiral compound, and anisotropy of dielectric constant of whole liquid crystal composition can be easily made low by decreasing a ratio of the decreasing-type chiral compound.

"Chiral compound increasing anisotropy of dielectric constant of liquid crystal composition" means that "when a chiral compound used is added to a nematic liquid crystal material at concentration of 1 wt % or more at 25° C., anisotropy of dielectric constant of liquid crystal composition becomes 0.1 or more larger than before addition of the chiral compound."

"Chiral compound decreasing anisotropy of dielectric constant of liquid crystal composition" means that "when a chiral compound used is added to a nematic liquid crystal material at concentration of 1 wt % or more at 25° C., anisotropy of dielectric constant of liquid crystal composition becomes 0.1 or more smaller than before addition of the chiral compound." It should be noted that whether the chiral compound increase or decrease anisotropy of dielectric constant depends on anisotropy of dielectric constant of nematic liquid crystal material.

Various kinds of chiral materials are known publicly (for example, Japanese patent application Laid-Open No.Hei 11-255675) and available on the market. Those chiral materials may be used with no particular limitation. However, it depends on nematic liquid crystal used whether the chiral material increases or decreases anisotropy of dielectric constant of liquid crystal composition compared to anisotropy of dielectric constant of nematic liquid crystal before its addition, or whether the shift direction of selective reflection wavelength depending on temperature with respect to chiral material is toward long wavelength direction or toward short wavelength direction. Therefore, chiral compounds are selected in accordance with nematic liquid crystals. Generally, chiral compounds containing polar groups such as cyano group and halogen atom are suitable for increasing-type chiral compounds and chiral compounds not containing polar groups such as cyano group and halogen atom are suitable for decreasing-type chiral compounds.

The chiral compound has such properties that make helical direction in helical structure clockwise or counter clockwise. When the first and second chiral materials are selected, the above properties are not taken into consideration as long as effects of the present invention may be obtained. It is, however, preferable that selection and combination is made among only chiral compounds having the same properties as make the helical direction in helical structure the same direction (having the same helical sense).

In the method A, two or more chiral compounds are used as at least one chiral material between the first chiral material and the second chiral material. A ratio of the two or more chiral compounds is changed to adjust anisotropy of dielectric constant ($\Delta\epsilon$) of whole chiral nematic liquid crystal composition to a desired value.

"Change of ratio" of two or more chiral compounds is made by two or more kinds of increasing-type chiral compounds, two or more kinds of decreasing-type chiral compounds, or a mixture of at least one kind of increasing-type chiral compound and at least one kind of decreasing-type chiral compound. It is preferable from the viewpoint of easy adjustment of anisotropy of dielectric constant of whole liquid crystal composition that increasing-type chiral compounds and decreasing-type chiral compounds are used to change its ratio. The ratio is determined depending on a desired value of anisotropy of dielectric constant.

In accordance with the method A, anisotropy of dielectric constant of whole composition can be easily adjusted to a desired value while securing a predetermined selective reflection wavelength. Although the change of the ratio of a chiral compound belonging to the first chiral material and a chiral compound belonging to the second chiral material makes it possible to adjust anisotropy of dielectric constant of whole composition when chiral compounds are in combination with "increasing type" and "decreasing type," it becomes difficult to select materials so that temperature compensation property of selective reflection wavelength can be secured effectively.

As a value of anisotropy of dielectric constant of whole liquid crystal composition that should be attained finally depends on a kind of nematic liquid crystal material, a cell gap where the liquid crystal composition is contained in a liquid crystal device and set-up selective reflection wavelength etc., its value can not be generally specified, but may be adjusted in the range of 3–40. If anisotropy of dielectric constant of liquid crystal composition is so much low, a driving voltage of the liquid crystal device using the liquid crystal composition becomes high. If anisotropy of dielectric constant of liquid crystal composition is so much high, stability of continuous display at room temperature and reliability to high and low temperature become low, resulting in easy generation of image defects and image noise.

A total content of the first chiral material and the second chiral material is an important factor for adjusting selective reflection wavelength of the obtained liquid crystal composition. Selective reflection wavelength of liquid crystal composition can be effectively adjusted by adjusting the total content of the chiral materials. As the total content of the chiral materials depends on kinds of nematic liquid crystal materials and chiral compounds, its usage can not be generally specified, but may in general be appropriate within the range between 3 and 40% by weight to total amount of nematic liquid crystal materials (all nematic liquid crystal material used) and chiral materials (all chiral compounds used). Even when the total content of the chiral materials is too much or too low, cholesteric phase would not be shown. When the usage is too much, driving voltage of liquid crystal device using the liquid crystal composition becomes too high.

In particular, when selective reflection wavelength is desired to be set to red wavelength of about 680 nm, a total content of the first chiral material and the second chiral material is appropriate within the range between 2 and 30% by weight to total amount of nematic liquid crystal materials (all nematic liquid crystal material used) and chiral materials (all chiral compounds used). When selective reflection wavelength is desired to be set to green wavelength of about 550 nm, the total content of the chiral materials is appropriate within the range between 3 and 30% by weight. When selective reflection wavelength is desired to be set to blue wavelength of about 480 nm, the total content of the chiral materials is appropriate within the range between 4 and 40% by weight.

An amount ratio of the first chiral material (total amount when plural chiral compounds are used as the first chiral material) to the second chiral material (total amount when plural chiral compounds are used as the second chiral material) is an important factor for securing excellent temperature compensation and is set in the range between 1:9 and 9:1, generally 3:7 and 7:3, so that shift toward long wavelength and shift toward short wavelength may be counterbalanced.

Additives such as coloring matters and ultraviolet absorber may be further added to the chiral nematic liquid crystal composition.

The coloring matter is added in order to improve color purity. Any kind of coloring matters known conventionally may be used as coloring matters added. The ones having good compatibility with liquid crystal is preferably used. For example, an azo compound, a quinone compound, an anthraquinone compound, etc. or a dichroic coloring matter etc. may be used. Plural kinds of these coloring matters may be used. An addition amount is, for example, desirably 3% by weight or less to total usage of nematic liquid crystal materials and chiral materials. If the addition amount is too large, light amount of selective reflection becomes low under planar state of liquid crystal, and contrast falls to the contrary.

The ultraviolet absorber is added in order to prevent ultraviolet deterioration of liquid crystal composition, for example, color degradation with time and change of responsibility. For example, materials, such as benzophenone compounds, benzotriazole compounds, and salicylate compounds, may be used. An addition amount is 5% by weight or less, preferably 3% by weight or less to total usage of nematic liquid crystal material and chiral materials.

Such a liquid crystal composition as prepared according to the above method A is a chiral nematic liquid crystal composition which can show cholesteric phase at room temperature and reflect light in visible region selectively;

the composition comprising a nematic liquid crystal material, a first chiral material with shift direction of selective reflection wavelength toward long wavelength direction depending on temperature and a second chiral material with shift direction of selective reflection wavelength toward short wavelength direction depending on temperature; and the composition including two or more kinds of chiral compounds (especially, increasing-type chiral compound and decreasing-type chiral compound) as at least one chiral material between the first and second chiral materials.

Next, the method B is explained in more detail below.

In the method B, a nematic liquid crystal material, a first chiral material with shift direction of selective reflection wavelength toward long wavelength direction depending on temperature and a second chiral material with shift direction of selective reflection wavelength toward short wavelength direction depending on temperature are mixed, wherein two or more kinds of nematic liquid crystal mixtures are used as a nematic liquid crystal material.

In accordance with the method B, when a ratio of the two or more kinds of nematic liquid crystal mixtures is adjusted, predetermined selective reflection wavelength can be secured and anisotropy of dielectric constant of whole liquid crystal composition can be easily adjusted to a desired value without big change of the ratio of total content of the two or more kinds of nematic liquid crystal mixtures to whole amount of the liquid crystal composition. Excellent temperature compensation property of selective reflection wavelength can be secured by adjusting a ratio of the first chiral material and the second chiral material within a predetermined range in manner similar to the method A.

The method B adjusts anisotropy of dielectric constant of whole liquid crystal composition by "changing a ratio of the two or more kinds of nematic liquid crystal mixtures," while the method A adjusts anisotropy of dielectric constant of whole liquid crystal composition by "changing a ratio of the two or more chiral compounds contained in at least one chiral material between the first chiral material and the second chiral material." The method A is excellent in that a dielectric constant can be adjusted more finely, while the method B is the one excellent in that preparation is easy as preparation is made with large loadings of nematic liquid crystals and that dielectric constant can be varied widely.

In the method B, two or more kinds of the same nematic liquid crystal materials as in the method A may be used. Since it is general that a mixture of plural liquid crystal compounds is used as a nematic liquid crystal material as described above, two or more kinds of nematic liquid crystal mixtures are used. When anisotropy of dielectric constant is different, "nematic liquid crystal mixture" is different in its kind. It is preferable that each of "two or more kinds of nematic liquid crystal mixtures" has a positive anisotropy of dielectric constant respectively. Preferable nematic liquid crystal mixture available on the market is the same as the ones exemplified as nematic liquid crystal mixtures in the method A.

As the nematic liquid crystal mixture can be used in combination within the range where the difference of anisotropy of dielectric constant is 0.4 or more and 35 or less, particularly 6–35, anisotropy of dielectric constant can be adjusted in a wide range. The combination among mixtures available on the market having relatively large difference in anisotropy of dielectric constant may be exemplified by ZLI1565 ($\Delta\epsilon$; 7.0) and E44 ($\Delta\epsilon$; 16.8), ZLI2248 ($\Delta\epsilon$; 7.4) and E44 ($\Delta\epsilon$; 16.8).

In the method B, anisotropy of dielectric constant ($\Delta\epsilon$) of whole liquid crystal composition is adjusted by changing a ratio of such two or more kinds of nematic liquid crystal mixtures. In more detail, as a ratio of nematic liquid crystal mixture having large anisotropy of dielectric constant increases, anisotropy of dielectric constant of whole liquid crystal composition may be heightened. As a ratio of nematic liquid crystal mixture having small anisotropy of dielectric constant increases, anisotropy of dielectric constant of whole liquid crystal composition may be lowered.

As to a first chiral material and a second chiral material in the method B, the same first chiral material and second chiral material as in the method A may be used. Two or more kinds of chiral compounds must be not necessarily used as one chiral material between the two. In the case where the method B and method A may be used together, two or more kinds of chiral compounds used in the method A may be used in a manner similar to the method A.

In the method B, total content of the first chiral material and the second chiral material and ratio of the first chiral material (total content when plural chiral compounds are used as first chiral materials) and second chiral material (total content when plural chiral compounds are used as second chiral materials) may be within the same range as in the method A.

Such a liquid crystal composition as prepared according to the above method B is a chiral nematic liquid crystal composition which can show cholesteric phase at room temperature and reflect light in visible region selectively;

the composition comprising a nematic liquid crystal material, a first chiral material with shift direction of selective reflection wavelength toward long wavelength direction depending on temperature and a second chiral material with shift direction of selective reflection wavelength toward short wavelength direction depending on temperature; and the composition including two or more kinds of nematic liquid crystal mixtures as nematic liquid crystal materials.

In such a chiral nematic liquid crystal composition as prepared according to the method A and/or method B, and a liquid crystal device using the liquid crystal composition thereof, selective reflection wavelength hardly shifts depending on change of ambient temperature to show predetermined selective reflection wavelength, and anisotropy of dielectric constant is adjusted to a desired value.

The use of the method A and/or method B makes it possible to make an adjusting range of anisotropy of dielectric constant of whole liquid crystal composition wide. In detail, it is possible to secure an adjusting range of 0.5 or more, preferably 1.0 or more in which a value of anisotropy of dielectric constant may range.

When anisotropy of dielectric constant of a chiral nematic liquid crystal composition is adjusted, the use of the method A and/or method B makes it possible to adjust it without changing total content of chiral materials. The adjusting range of the chiral materials can be made within the range of 5% by weight or less, preferably 3% by weight or less to total weight of whole liquid crystal compositions.

The chiral nematic liquid crystal composition has anisotropy of refractive index of 0.11 or more, preferably 0.11–0.30. The anisotropy of refractive index can be easily controlled mainly by adjusting refractive index of nematic liquid crystals while adjusting anisotropy of dielectric constant in the method A and the method B.

When two or more liquid crystal devices using such liquid crystal compositions are stacked to produce a layered-type liquid crystal device, anisotropy of dielectric constant can be adjusted effectively at the preparation of respective liquid crystal composition so that driving properties such as threshold voltage (driving voltage) and applied voltage-reflectance property can be made in conformity with each other. Driving power supplies of liquid crystal devices can be easily made common and production cost can be reduced.

Further, in the method A and method B, anisotropy of dielectric constant can be adjusted by changing ratio of two or more chiral compounds (especially increasing-type chiral compounds and decreasing-type chiral compounds) used as at least one chiral material between first and second chiral materials, or ratio of two or more nematic liquid crystal mixtures, so that variability of driving properties caused by variability of lots and production can be adjusted by liquid crystal compositions.

An example of liquid crystal devices using chiral nematic liquid crystal compositions prepared according to the above methods A and/or B, and an example of layered-type liquid crystal device with two or more liquid crystal layers stacked are briefly explained below by referring to FIGS. 1 to 3.

Figure 1B:
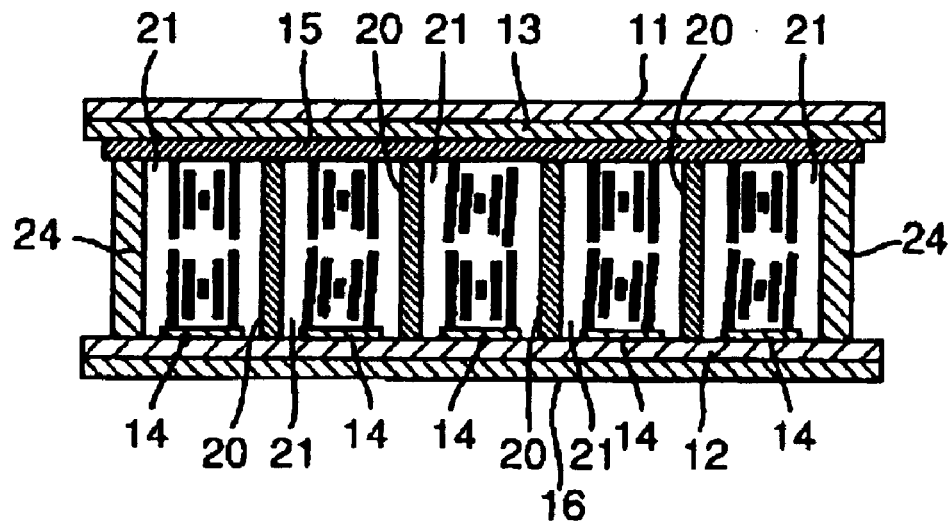

FIG. 1(A) and FIG. 1(B) are schematic sectional views as examples of liquid crystal device of the present invention. FIG. 1(A) shows a planar state (colored state) when high-voltage pulse is applied. FIG. 1(B) shows a focal conic state (transparent/black color-displaying state) when low-voltage pulse is applied. This liquid crystal display device has memorizability. The planar state and focal conic state are maintained after pulse voltage is applied. FIG. 1(A) and FIG. 1(B) are same except that applied voltage is different. When both FIG. 1(A) and FIG. 1(B) are referred to, just the wording of FIG. 1 is used hereinafter.

The liquid crystal device of FIG. 1 has a structure in which a liquid crystal composition 21 is put and held between a pair of substrates 11 and 12. In FIG. 1, the numerals 11 and 12 show transparent substrates with light transmission respectively. Transparent electrodes 13 and 14 are formed stripelike with parallel and plural stripes on each surface of the transparent substrates 11 and 12. These electrodes 13 and 14 are arranged to face each other so that they may cross mutually. It is preferable that the electrodes 13, 14 are coated with an insulating thin layer. In this example, only the electrode 13 is coated with an insulating thin layer 15. A visible light-absorption black layer 16 is formed on the external surface (back side) of the substrate opposite to the side of incident light, if necessary. The numeral 20 shows a column-shaped structure as a space-keeping member. The numeral 21 shows a chiral nematic liquid crystal composition showing cholesteric phase at room temperature. The numeral 24 shows a sealing member for sealing the liquid crystal composition 21 between the substrates 11 and 12.

Main constituting members among the liquid crystal display members are explained in detail below.

Substrate

In FIG. 1, the substrates 11 and 12 has light-transmitting property as stated above. In the pair of substrates usable in the liquid crystal device in the embodiment of the present invention, at least one of the substrate (at least the incident light-side substrate) has light-transmitting property. The substrate having light-transmitting property may be exemplified by a glass substrate. Besides a glass substrate, flexible substrates, such as a polycarbonate (PC), a polyether sulfone (PES), a polyarylate (PAr) and polyethylene terephthalate (PET), can be used. It is desirable to use a flexible substrate from a viewpoint of weight-saving of the device.

Electrode

As to the electrodes, transparent electric conductive layers, such as Indium Tin Oxide (ITO: indium tin oxide) and Indium Zinc Oxide (IZO: indium zinc oxide), metal electrodes, such as aluminum and silicon, or photoconductive layers, such as amorphous silicon and BSO (Bismuth Silicon Oxide) may be used. In the liquid crystal device shown FIG. 1, transparent electrodes 13 and 14 are formed stripelike with parallel and plural stripes on each surface of the transparent substrates 11 and 12, and these electrodes 13 and 14 are arranged to face each other so that they may cross mutually. The formation of such patterned electrodes may be carried out by a mask deposition method in which ITO layer is formed on the substrate by sputtering process, or may be carried out by a photolithography method after ITO layer is formed on the whole surface of the substrate.

Insulating Thin Film

In the embodiment of the liquid crystal devices of the present invention, an insulating thin film is formed in order to prevent short circuit between electrodes, or in order to improve reliability to gas-barrier property in the liquid crystal device. As described above, the surface of the electrode 13 is coated with the insulating thin film 15. The insulating thin film is exemplified by organic materials such as silicon oxide, titanium oxide, zirconium oxide and alkoxides thereof, and organic layers such as polyimide resins, acrylic resins and urethane resins. The insulating thin film may be formed by a known method, such as a deposition method, spin-coating method and a roll-coating method. When a coloring matter is added into the insulating thin film, the thin film can function as a color filter. Color purity can be improved while improving the preventing properties of short circuit between electrodes and the reliability on the device by giving function of color filter. The insulating thin film may be formed with the same materials as polymer resins used for column-shaped structures.

Orientation Film

An orientation film may be formed in order to control and stabilize orientation of liquid crystal composition effectively. The orientation film is optional, and therefore, is not necessarily formed. When formed, the orientation film is formed on the insulating thin film in the case where the insulating thin film is formed on the electrode, and on the electrode in the case where the insulating thin film is not formed on the electrode. The orientation film is exemplified by organic films, such as polyimide resins, polyamide-imide resins, polyether-imide resins, polyvinyl-butyral resins, acrylic resins, and inorganic films, such as silicon oxide and aluminum oxide. Orientation films formed of those materials may be subjected to rubbing treatment.

Spacer

Spacers may be arranged between a pair of substrates in the embodiments of the liquid crystal devices of the present invention in order to keep gap between the substrates uniform. Such spacer is exemplified by a sphere made of resins or inorganic oxides. An retention spacer the surface of which is coated with thermoplastic resin may be suitably used. Just column-like structure may be formed in order to keep gap between substrates uniform as shown in FIG. 1. Either spacer or column-like structure may be formed instead of the column-like structure. Just spacer may be formed as a space-keeping member. When the column-like structure is formed, a diameter of the spacer is equal to or less than its height, preferably equal to its height. When the column-like structure is not formed, a diameter of spacer corresponds to a thickness of cell gap, or a thickness of liquid crystal layer of liquid crystal composition.

Liquid Crystal Composition

A liquid crystal composition is a chiral nematic liquid crystal composition prepared according to the above method A and/or B. If necessary, purification is made in contact with ion-exchange resin or an absorbent to remove water or impurities.

Column-like Structure

As shown in FIG. 1, the pair of substrates is preferably supported by column-like structures between the substrates in order to give self-supporting property (strength) in the embodiment of the liquid crystal device of the present invention. The column-like structures 20 are formed between the substrates 11 and 12 in the present example. Column-like structure is exemplified by cylindrical members, square pole-like members, elliptic pole-like members, trapezoid pole-like members and cone pole-like members, being arranged at specific interval in specific pattern, such as lattice arrangement. The pattern may be stripes arranged at specific interval. The column-like structure is not arranged randomly, but preferably arranged taking it into consideration that the space between substrates can be kept and image-display is not obstructed, being exemplified by arrangement with regular interval, arrangement with intervals gradually changing, arrangement with specified pattern repeated at specified cycle. When the column-like structure occupies 1–40% of display area in the liquid crystal device, practically satisfying display-properties as a display device are achieved while suitable strength is maintained. General resins, such as epoxy resins, acrylic resins, polyester resins, polyether resins, polyethylene resins, polyimide resins, may be used as a resin material. The height of column-like structure corresponds to thickness of cell gap or thickness of liquid crystal layer of liquid crystal composition.

The column-like structure may be formed by means of a printing method, a photolithography method. The liquid crystals may be enclosed by a dropping method or injected by a vacuum-injecting method. Hard spacer may be used in combination.

The cell gap or thickness of liquid crystal phase in a liquid crystal device is suitably in the range of 2.5–10 $\mu$m.

A color filter is not used in the above described liquid crystal device. When coloring matters are not added into liquid crystal compositions, a color filter is arranged on the substrate in the observation side in order to improve color purification. A material used in the filter may be a transparent and colorless substance added with coloring matters, or an essentially colored substance without addition of coloring matters. For example, a filter layer may be a thin film formed of a specific substance having the same function as coloring matters. When the transparent substrate itself constituting a liquid crystal device may be replaced with the above filter member, the same effects can be obtained.

The liquid crystal device as above mentioned is excellent in contrast because Y value is larger at the time of planar state and Y value is smaller at the time of focal conic state. The Y value is one of indexes showing how large the reflectance of outdoor light is. The larger the Y value is, the larger the reflectance is. The smaller the Y value is, the smaller the reflectance is. In the present specification, the values measured by spectrophotometer CM3700d available from Minolta Co., Ltd. are used as Y value.

In a preferred embodiment of a layered-type liquid crystal device of the present invention, plural liquid crystal layers each of which is put and held between a pair of substrates are stacked. Each liquid crystal layer contains the above chiral nematic liquid crystal composition prepared according to the method A and/or the method B. For Example, two or more liquid crystal devices as shown in FIG. 1 are stacked.

Figure 2:
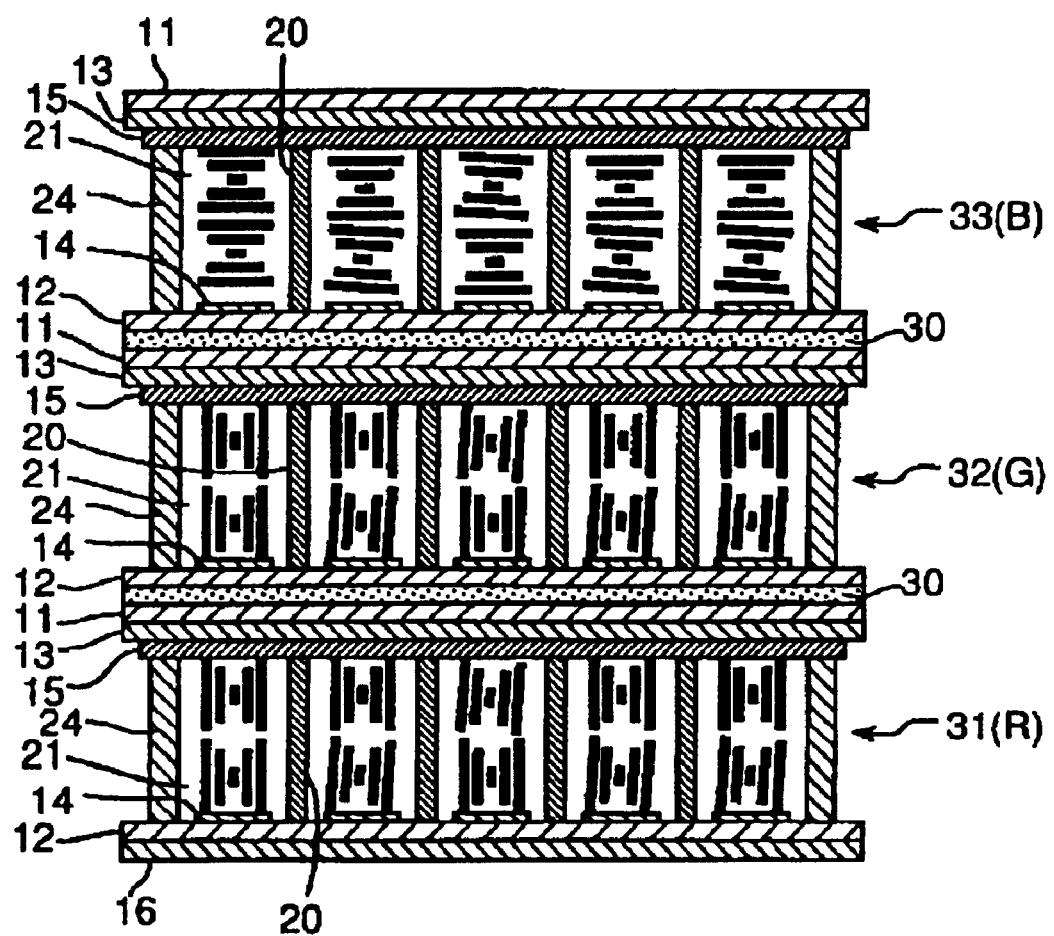
FIG. 2 is a schematic sectional view of one example of stacked liquid crystal devices of the present invention.

FIG. 2 is a schematic sectional view of one example of layered-type liquid crystal device for full color with three liquid crystal layers stacked. In more detail, in the layered-type liquid crystal display device of FIG. 2, three liquid crystal display devices each of which is the same as the liquid crystal display device of FIG. 1 except for formation of no visible light-absorption layer 16. A visible light-absorption layer 16 is formed just on the bottom of the lowest positioned liquid crystal device 31. It is necessary that substrates are transparent except for the substrate 12 in the lowest positioned liquid crystal device 31. In FIG. 2, the same numerals as in FIG. 1 are allotted to the same members as in FIG. 1. The explanation thereof is omitted.

Each liquid crystal device (31, 32 and 33) incorporates chiral nematic liquid crystal compositions 21 prepared so that light with specified wavelength can be reflected selectively. Composition materials of the liquid crystal composition incorporated in each liquid crystal device (31, 32 and 33) are used in combination of the same materials. In the chiral nematic liquid crystal composition used in each liquid crystal display device, (A) a ratio of the two or more chiral compounds contained in at least one chiral material between the first chiral material and the second chiral material, and/or (B) a ratio of the two or more kinds of nematic liquid crystal mixtures used as nematic liquid crystal materials are different in each liquid crystal display device.

In FIG. 2, selective reflection wavelengths in the liquid crystal display devices (31, 32 and 33) are set to red wavelength (R), green wavelength (G) and blue wavelength (B). The order of R, G, B is not particularly restricted. It is to be noted that the upper and lower devices use the same substrate together so that the number of substrates between the liquid crystal layers may be one. The number of substrates used reduces to prevent undesired light-scattering, resulting in improvement of display properties.

Figure 3:
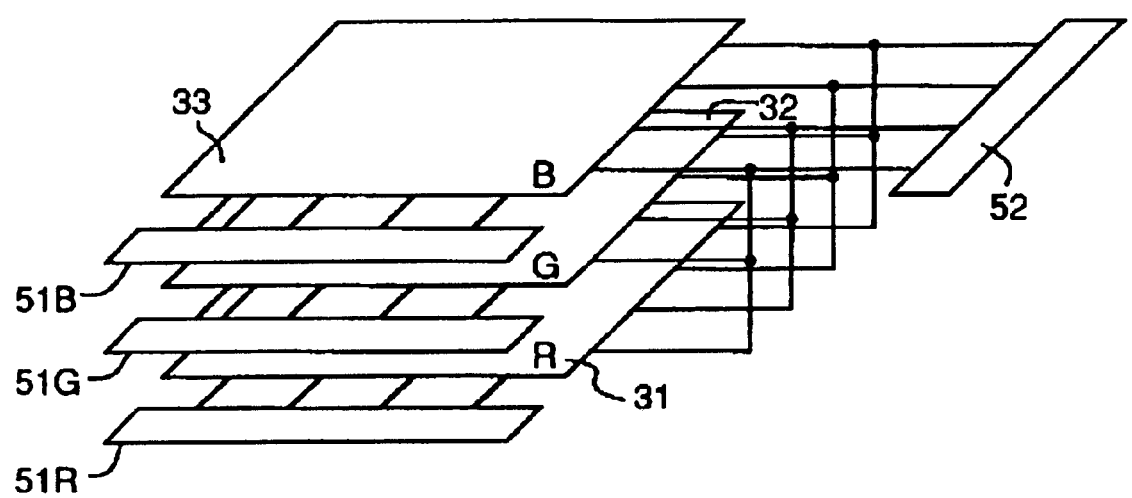
FIG. 3 is a schematic view of connected system of electrodes for driving the stacked liquid crystal device of FIG. 2.

As shown in FIG. 3, scanning electrodes (the numeral 13 (or the numeral 14) in FIG. 2) of liquid crystal devices (31, 32 and 33) are connected to a common scan-driving IC 52. Each signal electrode (the numeral 14 (or the numeral 13) in FIG. 2) in the liquid crystal devices (31, 32 and 33) is connected independently to three signal driving IC 51R, 51G and 51B. The voltage difference between voltages applied by each signal driving IC 51R, 51G, 51B and the scan-driving IC 52 is voltage for driving each liquid crystal device. In FIG. 2, relatively high voltage is applied only to the liquid crystal device 33 for blue display to be in planar state. Relatively low voltage is applied to the liquid crystal device 31 for red display and the liquid crystal device 33 for green display to be in focal conic state. The layered-type liquid crystal display device for full color reflects only blue color selectively as a whole.

The stacking of the liquid crystal devices (31, 32 and 33) is achieved by adhesive layers 30. Such an adhesive layer may be formed of any material so far as the adhesive layer has transparency and the liquid crystal devices (31, 32 and 33) can be unified. For example, a double-sided adhesion sheet etc. may be exemplified.

From a viewpoint that driving property of each liquid crystal display device is made approximate, it is preferable that cell gaps of each liquid crystal devices (31, 32 and 33) is equal. In the embodiments of the present invention, anisotropy of dielectric constant is adjusted effectively at the preparation stage of liquid crystal compositions incorporated in each liquid crystal display device. Therefore, at least a pair of liquid crystal display devices having different cell gap among liquid crystal display devices (31, 32 and 33) may be incorporated. The cell gap is thickness of space where liquid crystal composition is put and held in each liquid crystal display device.

In such a stacked liquid crystal display device, anisotropy of dielectric constant is adjusted effectively at the preparation stage of liquid crystal compositions incorporated in each liquid crystal device. Therefore, remarkable variability in driving properties, especially threshold voltage in each liquid crystal display device does not arise depending on variability caused by lots of liquid crystal composition materials, such as nematic liquid crystal materials and chiral liquid crystal materials and on variability of production conditions, such as cell gap. Therefore, power supply for driving each liquid crystal display device is easily made common.

EXAMPLES

The relationship between chiral compounds used in Examples and liquid crystal mixtures are shown below.

Chiral compounds (CB15, MLC6248, CN, and MLC6247) are mixed with ZLI1565 at a content of 39.3% by weight, 26.2% by weight, 55% by weight, 26.2% by weight respectively. When the temperature of the mixtures are raised from 25° C. to 60° C., selective reflection wavelengths shift respectively 80 nm, 30 nm, 30 nm, 30 nm toward long wavelength direction from the selective reflection wavelengths of the mixtures before the temperature is raised.

Chiral compounds (R811, and S811) are mixed with ZLI1565 at a content of 31.5% by weight respectively. When the temperature of the mixtures are raised from 25° C. to 60° C., selective reflection wavelengths shift respectively 70 nm, 70 nm toward short wavelength direction from the selective reflection wavelengths of the mixtures before the temperature is raised.

When the chiral compound CB15 is added to ZLI1565 at 39.3% by weight at 25° C., the value of anisotropy of dielectric constant of the liquid crystal composition increased by 2 before addition.

When the chiral compounds (MLC6247, MLC6248, and CN) is added to ZLI1565 respectively at 26.2% by weight, 26.2% by weight, 55% by weight at 25° C., the value of anisotropy of dielectric constant of the liquid crystal composition decreased by 2, 2, and 3 before addition.

Experimental Example 1-1

Seven parts by weight of chiral material CB15 (available from Merck Ltd., Japan), 7.6 parts by weight of MLC6248 (available from Merck Ltd., Japan), 15.0 parts by weight of R811 (available from Merck Ltd., Japan) were added to and mixed with 70.4 parts by weight of nematic liquid crystal ZLI1565 ($\Delta\epsilon 7.0$; available from Merck Ltd., Japan) to give Chiral nematic liquid crystal A. The ratio of CB15 and MLC6248 as the first chiral material was approximately 1:1.

The Chiral nematic liquid crystal A showed cholesteric phase and peak reflection wavelength at around 540 nm.

The Chiral nematic liquid crystal A had anisotropy of dielectric constant $\Delta\epsilon$ of 4.3 and showed temperature shift of peak reflection wavelength of 0.6 nm from 25° C. to 60° C., being equal to almost no shift.

A horizontal orientation film AL4552 (available from JSR Corp.) of thickness of 800 Å was formed on the transparent electrode ITO (indium tin oxide) formed on PC (polycarbonate) film as one of the two substrates. Screen printing was carried out with polyester resin to form column-like structures on the film.

Spacers of 6 μm diameter (available from Sekisui Fine Chemical Co., Ltd.) were scattered on the film.

A horizontal orientation film AL4552 (available from JSR Corp.) of thickness of 800 Å was formed on the ITO transparent electrode ITO formed on PC film as the other one of the two substrates to be subjected to a rubbing treatment.

Then, screen printing was carried out at circumference section of the first substrate with a sealing material XN21S (available from Mitsui Chemicals Inc.) to form a wall of predetermined height. A predetermined amount of Chiral nematic liquid crystal A was dropped and the two substrates were piled up and subjected to a heating and hardening treatment.

Light-absorbing film of black color was formed on the backside cell (substrate side opposite to the incident light-side substrate) to give a liquid crystal display device.

Device properties of Chiral nematic liquid crystal A were measured to give the results as below (applied pulse width: 5 nm).

Black Y value: 5.8 (driving voltage: 45 V), colored Y value: 21.3 (driving voltage: 64 V), peak reflectance: 36.5%.

Experimental Example 1-2

Chiral material CB15 (10.4 parts by weight) (available from Merck Ltd., Japan), 4.5 parts by weight of MLC6248 (available from Merck Ltd., Japan), 15.8 parts by weight of R811 (available from Merck Ltd., Japan) were added to and mixed with 69.3 parts by weight of nematic liquid crystal ZLI1565 ($\Delta\epsilon 7.0$; available from Merck Ltd., Japan) to give Chiral nematic liquid crystal B. The ratio of CB15 and MLC6248 as the first chiral material was approximately 7:3.

The Chiral nematic liquid crystal B showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal B was used.

Device properties of Chiral nematic liquid crystal B were measured to give the results as below (applied pulse width: 5 nm).

Black Y value: 6.2 (driving voltage: 40 V), colored Y value: 20.5 (driving voltage: 61 V), peak reflectance: 36.0%.

The Chiral nematic liquid crystal B had anisotropy of dielectric constant $\Delta\epsilon$ of 5.4 and showed temperature shift of peak reflection wavelength of 1.5 nm from 25° C. to 60° C., being equal to almost no shift.

As clearly shown in comparison with Experimental Example 1-1, when the ratio of CB15 and MLC6248 was set to 7:3 from 1:1, the value $\Delta\epsilon$ became higher to be 5.4 and the driving voltage was 40V (focal conic state) and 61V (planar state), being about 3–4 V lower.

Experimental Example 1-3

Chiral material CB15 (4.3 parts by weight) (available from Merck Ltd., Japan), 10.1 parts by weight of MLC6248 (available from Merck Ltd., Japan), 14.2 parts by weight of R811 (available from Merck Ltd., Japan) were added to and mixed with 71.4 parts by weight of nematic liquid crystal ZLI1565 ($\Delta\epsilon 7.0$; available from Merck Ltd., Japan) to give Chiral nematic liquid crystal C. The ratio of CB15 and MLC6248 as the first chiral material was approximately 3:7.

The Chiral nematic liquid crystal C showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal C was used.

Device properties of Chiral nematic liquid crystal C were measured to give the results as below (applied pulse width: 5 nm).

Black Y value: 5.4 (driving voltage: 50 V), colored Y value: 22.1 (driving voltage: 67 V), peak reflectance: 37.0%.

The Chiral nematic liquid crystal C had anisotropy of dielectric constant $\Delta\epsilon$ of 4.0 and showed temperature shift of peak reflection wavelength of 2.5 nm from 25° C. to 60° C., being equal to almost no shift.

As clearly shown in comparison with Experimental Example 1-1, when the ratio of CB15 and MLC6248 was set to 3:7 from 1:1, the value $\Delta\epsilon$ became lower to be 4.0 and the driving voltage was 50V (focal conic state) and 67V (planar state), being about 3–5 V higher.

Experimental Example 2-1

Chiral material CB15 (6 parts by weight) (available from Merck Ltd., Japan), 6 parts by weight of MLC6248 (available from Merck Ltd., Japan), 18 parts by weight of R811 (available from Merck Ltd., Japan) were added to and mixed with a mixture of 35 parts by weight of nematic liquid crystal ZLI1565 ($\Delta\epsilon 7.0$; available from Merck Ltd., Japan) and 35 parts by weight of nematic liquid crystal E44 ($\Delta\epsilon 16.8$; available from Merck Ltd., Japan) to give Chiral nematic liquid crystal D. The ratio of two kinds of the nematic liquid crystals was approximately 1:1.

The Chiral nematic liquid crystal D showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal D was used.

Device properties of Chiral nematic liquid crystal D were measured to give the results as below (applied pulse width: 5 nm).

Black Y value: 6.0 (driving voltage: 35 V), colored Y value: 23.8 (driving voltage: 48 V), peak reflectance: 39.2%.

The Chiral nematic liquid crystal D had anisotropy of dielectric constant $\Delta\epsilon$ of 12.8 and showed temperature shift of peak reflection wavelength of 3.0 nm from 25° C. to 60° C., being equal to almost no shift.

Experimental Example 2-2

Chiral material CB15 (7 parts by weight) (available from Merck Ltd., Japan), 7 parts by weight of MLC6248 (available from Merck Ltd., Japan), 16 parts by weight of R811 (available from Merck Ltd., Japan) were added to and mixed with a mixture of 21 parts by weight of nematic liquid crystal ZLI1565 ($\Delta\epsilon$7.0; available from Merck Ltd., Japan) and 49 parts by weight of nematic liquid crystal E44 ($\Delta\epsilon$16.8; available from Merck Ltd., Japan) to give Chiral nematic liquid crystal E. The ratio of two kinds of the nematic liquid crystals was approximately 3:7.

The Chiral nematic liquid crystal E showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal E was used.

Device properties of Chiral nematic liquid crystal E were measured to give the results as below (applied pulse width: 5 nm).

Black Y value: 6.2 (driving voltage: 31 V), colored Y value: 24.2 (driving voltage: 44 V), peak reflectance: 39.2%.

The Chiral nematic liquid crystal E had anisotropy of dielectric constant $\Delta\epsilon$ of 13.8 and showed temperature shift of peak reflection wavelength of 3.5 nm from 25° C. to 60° C., being equal to almost no shift.

As clearly shown in comparison with Experimental Example 2-1, when the ratio of ZLI1565 and E44 was set from 1:1 to 3:7, the value $\Delta\epsilon$ became higher to be 13.8 and the driving voltage became lower to be 31V (focal conic state) and 44V (planar state).

Experimental Example 2-3

Chiral material CB15 (7 parts by weight) (available from Merck Ltd., Japan), 7 parts by weight of MLC6248 (available from Merck Ltd., Japan), 16 parts by weight of R811 (available from Merck Ltd., Japan) were added to and mixed with a mixture of 49 parts by weight of nematic liquid crystal ZLI1565 ($\Delta\epsilon$7.0; available from Merck Ltd., Japan) and 21 parts by weight of nematic liquid crystal E44 ($\Delta\epsilon$16.8; available from Merck Ltd., Japan) to give Chiral nematic liquid crystal F. The ratio of two kinds of the nematic liquid crystals was approximately 7:3.

The Chiral nematic liquid crystal F showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal F was used.

Device properties of Chiral nematic liquid crystal F were measured to give the results as below (applied pulse width: 5 nm).

Black Y value: 5.8 (driving voltage: 38 V), colored Y value: 23.5 (driving voltage: 51 V), peak reflectance: 38.8%.

The Chiral nematic liquid crystal F had anisotropy of dielectric constant $\Delta\epsilon$ of 12.0 and showed temperature shift of peak reflection wavelength of 4.0 nm from 25° C. to 60° C., being equal to almost no shift.

As clearly shown in comparison with Experimental Example 2-1, when the ratio of ZLI1565 and E44 was set to 7:3 from 1:1, the value $\Delta\epsilon$ became lower to be 12.0 and the driving voltage became higher to be 38V (focal conic state) and 51V (planar state).

Experimental Example 3-1

Chiral material CB15 (7.9 parts by weight) (available from Merck Ltd., Japan), 8.6 parts by weight of MLC6248 (available from Merck Ltd., Japan), 17.0 parts by weight of R811 (available from Merck Ltd., Japan) were added to and mixed with 66.5 parts by weight of nematic liquid crystal ZLI1565 ($\Delta\epsilon$7.0; available from Merck Ltd., Japan) to give Chiral nematic liquid crystal G. The ratio of CB15 and MLC6248 as the first chiral material was approximately 1:1.

The Chiral nematic liquid crystal G showed cholesteric phase and peak reflection wavelength at around 480 nm.

A liquid crystal display device was produced up to the process of formation of the absorbing film of black color in a manner similar to Experimental Example 1-1 except that Chiral nematic liquid crystal G was used.

Device properties of Chiral nematic liquid crystal G were measured to give the results as below (applied pulse width: 5 nm).

Black Y value: 5.0 (driving voltage: 55 V), colored Y value: 9.2 (driving voltage: 74 V), peak reflectance: 38.0%.

The Chiral nematic liquid crystal G had anisotropy of dielectric constant $\Delta\epsilon$ of 4.0 and showed temperature shift of peak reflection wavelength of 3 nm from 25° C. to 60° C., being equal to almost no shift.

Experimental Example 3-2

Chiral material CB15 (11.8 parts by weight) (available from Merck Ltd., Japan), 5.09 parts by weight of MLC6248 (available from Merck Ltd., Japan), 17.9 parts by weight of R811 (available from Merck Ltd., Japan) were added to and mixed with 65.21 parts by weight of nematic liquid crystal ZLI1565 ($\Delta\epsilon$7.0; available from Merck Ltd., Japan) to give Chiral nematic liquid crystal H. The ratio of CB15 and MLC6248 as the first chiral material was approximately 7:3.

The Chiral nematic liquid crystal H showed cholesteric phase and peak reflection wavelength at around 480 nm.

A liquid crystal display device was produced up to the process of formation of the absorbing film of black color in a manner similar to Experimental Example 1-1 except that Chiral nematic liquid crystal H was used.

Device properties of Chiral nematic liquid crystal H were measured to give the results as below (applied pulse width: 5 nm).

Black Y value: 5.3 (driving voltage: 50 V), colored Y value: 8.8 (driving voltage: 71 V), peak reflectance: 38.2%.

The Chiral nematic liquid crystal H had anisotropy of dielectric constant $\Delta\epsilon$ of 5.1 and showed temperature shift of peak reflection wavelength of 2 nm from 25° C. to 60° C., being equal to almost no shift.

As clearly shown in comparison with Experimental Example 3-1, when the ratio of CB15 and MLC6248 was set to 7:3 from 1:1, the value $\Delta\epsilon$ of the liquid crystal composition became higher to be 5.1 and the driving voltage became lower to be 50V (focal conic state) and 71V (planar state).

Experimental Example 3-3

Chiral material CB15 (4.9 parts by weight) (available from Merck Ltd., Japan), 11.4 parts by weight of MLC6248 (available from Merck Ltd., Japan), 16.0 parts by weight of R811 (available from Merck Ltd., Japan) were added to and mixed with 67.7 parts by weight of nematic liquid crystal ZLI1565 ($\Delta\epsilon 7.0$; available from Merck Ltd., Japan) to give Chiral nematic liquid crystal I. The ratio of CB15 and MLC6248 as the first chiral material was approximately 3:7.

The Chiral nematic liquid crystal I showed cholesteric phase and peak reflection wavelength at around 480 nm.

A liquid crystal display device was produced up to the process of formation of the absorbing film of black color in a manner similar to Experimental Example 1-1 except that Chiral nematic liquid crystal I was used.

Device properties of Chiral nematic liquid crystal I were measured to give the results as below (applied pulse width: 5 nm).

Black Y value: 4.8 (driving voltage: 60 V), colored Y value: 9.4 (driving voltage: 77 V), peak reflectance: 38.5%.

The Chiral nematic liquid crystal I had anisotropy of dielectric constant $\Delta\epsilon$ of 3.7 and showed temperature shift of peak reflection wavelength of 1 nm from 25° C. to 60° C., being equal to almost no shift.

As clearly shown in comparison with Experimental Example 3-1, when the ratio of CB15 and MLC6248 was set to 3:7 from 1:1, the value $\Delta\epsilon$ of the liquid crystal composition became lower to be 3.7 and the driving voltage became higher to be 60V (focal conic state) and 77V (planar state).

Experimental Example 4-1

Chiral material CB15 (5.5 parts by weight) (available from Merck Ltd., Japan), 6.0 parts by weight of MLC6248 (available from Merck Ltd., Japan), 11.8 parts by weight of R811 (available from Merck Ltd., Japan) were added to and mixed with 76.7 parts by weight of nematic liquid crystal ZLI1565 ($\Delta\epsilon 7.0$; available from Merck Ltd., Japan) to give Chiral nematic liquid crystal J. The ratio of CB15 and MLC6248 as the first chiral material was approximately 1:1.

The Chiral nematic liquid crystal J showed cholesteric phase and peak reflection wavelength at around 670 nm.

A liquid crystal display device was produced up to the process of formation of the absorbing film of black color in a manner similar to Experimental Example 1-1 except that Chiral nematic liquid crystal J was used.

Device properties of Chiral nematic liquid crystal J were measured to give the results as below (applied pulse width: 5 nm).

Black Y value: 5.7 (driving voltage: 35 V), colored Y value: 8.2 (driving voltage: 54 V), peak reflectance: 38.0%.

The Chiral nematic liquid crystal J had anisotropy of dielectric constant $\Delta\epsilon$ of 4.6 and showed temperature shift of peak reflection wavelength of 1.0 nm from 25° C. to 60° C., being equal to almost no shift.

Experimental Example 4-2

Chiral material CB15 (8.2 parts by weight) (available from Merck Ltd., Japan), 3.5 parts by weight of MLC6248 (available from Merck Ltd., Japan), 12.4 parts by weight of R811 (available from Merck Ltd., Japan) were added to and mixed with 75.9 parts by weight of nematic liquid crystal ZLI1565 ($\Delta\epsilon 7.0$; available from Merck Ltd., Japan) to give Chiral nematic liquid crystal K. The ratio of CB15 and MLC6248 as the first chiral material was approximately 7:3.

The Chiral nematic liquid crystal K showed cholesteric phase and peak reflection wavelength at around 680 nm.

A liquid crystal display device was produced up to the process of formation of the absorbing film of black color in a manner similar to Experimental Example 1-1 except that Chiral nematic liquid crystal K was used.

Device properties of Chiral nematic liquid crystal K were measured to give the results as below (applied pulse width: 5 nm).

Black Y value: 5.9 (driving voltage: 30 V), colored Y value: 8.0 (driving voltage: 51 V), peak reflectance: 33.2%.

The Chiral nematic liquid crystal K had anisotropy of dielectric constant $\Delta\epsilon$ of 5.7 and showed temperature shift of peak reflection wavelength of 1.0 nm from 25° C. to 60° C., being equal to almost no shift.

As clearly shown in comparison with Experimental Example 4-1, when the ratio of CB15 and MLC6248 was set to 7:3 from 1:1, the value $\Delta\epsilon$ of the liquid crystal composition became higher to be 5.7 and the driving voltage became lower to be 30V (focal conic state) and 51V (planar state).

Experimental Example 4-3

Chiral material CB15 (3.4 parts by weight) (available from Merck Ltd., Japan), 8.0 parts by weight of MLC6248 (available from Merck Ltd., Japan), 11.2 parts by weight of R811 (available from Merck Ltd., Japan) were added to and mixed with 77.4 parts by weight of nematic liquid crystal ZLI1565 ($\Delta\epsilon 7.0$; available from Merck Ltd., Japan) to give Chiral nematic liquid crystal L. The ratio of CB15 and MLC6248 as the first chiral material was approximately 3:7.

The Chiral nematic liquid crystal L showed cholesteric phase and peak reflection wavelength at around 680 nm.

A liquid crystal display device was produced up to the process of formation of the absorbing film of black color in a manner similar to Experimental Example 1-1 except that Chiral nematic liquid crystal L was used.

Device properties of Chiral nematic liquid crystal L were measured to give the results as below (applied pulse width: 5 nm).

Black Y value: 5.4 (driving voltage: 40 V), colored Y value: 8.5 (driving voltage: 57 V), peak reflectance: 33.5%.

The Chiral nematic liquid crystal L had anisotropy of dielectric constant $\Delta\epsilon$ of 4.3 and showed temperature shift of peak reflection wavelength of 1.0 nm from 25° C. to 60° C., being equal to almost no shift.

As clearly shown in comparison with Experimental Example 4-1, when the ratio of CB15 and MLC6248 was set to 3:7 from 1:1, the value $\Delta\epsilon$ of the liquid crystal composition became lower to be 4.3 and the driving voltage became higher to be 40V (focal conic state) and 57V (planar state).

Experimental Example 5-1

Chiral material CB15 (6.78 parts by weight) (available from Merck Ltd., Japan), 6.78 parts by weight of MLC6248 (available from Merck Ltd., Japan), 20.34 parts by weight of R811 (available from Merck Ltd., Japan) were added to and mixed with a mixture of 33.05 parts by weight of nematic liquid crystal ZLI1565 (Δε7.0; available from Merck Ltd., Japan) and 33.05 parts by weight of nematic liquid crystal E44 (Δε16.8; available from Merck Ltd., Japan) to give Chiral nematic liquid crystal M. The ratio of two kinds of the nematic liquid crystals was approximately 1:1.

The Chiral nematic liquid crystal M showed cholesteric phase and peak reflection wavelength at around 470 nm.

A liquid crystal display device was produced up to the process of formation of the absorbing film of black color in a manner similar to Experimental Example 1-1 except that Chiral nematic liquid crystal M was used.

Device properties of Chiral nematic liquid crystal M were measured to give the results as below (applied pulse width: 5 nm).

Black Y value: 5.3 (driving voltage: 45 V), colored Y value: 9.5 (driving voltage: 58 V), peak reflectance: 42.5%.

The Chiral nematic liquid crystal M had anisotropy of dielectric constant Δε of 12.3 and showed temperature shift of peak reflection wavelength of 2.0 nm from 25° C. to 60° C., being equal to almost no shift.

Experimental Example 5-2

Chiral material CB15 (7.91 parts by weight) (available from Merck Ltd., Japan), 7.91 parts by weight of MLC6248 (available from Merck Ltd., Japan), 18.08 parts by weight of R811 (available from Merck Ltd., Japan) were added to and mixed with a mixture of 19.83 parts by weight of nematic liquid crystal ZLI1565 (Δε7.0; available from Merck Ltd., Japan) and 46.27 parts by weight of nematic liquid crystal E44 (Δε16.8; available from Merck Ltd., Japan) to give Chiral nematic liquid crystal N. The ratio of two kinds of the nematic liquid crystals was approximately 3:7.

The Chiral nematic liquid crystal N showed cholesteric phase and peak reflection wavelength at around 470 nm.

A liquid crystal display device was produced up to the process of formation of the absorbing film of black color in a manner similar to Experimental Example 1-1 except that Chiral nematic liquid crystal N was used.

Device properties of Chiral nematic liquid crystal N were measured to give the results as below (applied pulse width: 5 nm).

Black Y value: 5.5 (driving voltage: 41 V), colored Y value: 9.8 (driving voltage: 54 V), peak reflectance: 42.3%.

The Chiral nematic liquid crystal N had anisotropy of dielectric constant Δε of 13.3 and showed temperature shift of peak reflection wavelength of 1.0 nm from 25° C. to 60° C., being equal to almost no shift.

As clearly shown in comparison with Experimental Example 5-1, when the ratio of ZLI1565 and E44 was set to 3:7 from 1:1, the value Δε of the liquid crystal composition became higher to be 13.3 and the driving voltage became lower to be 41V (focal conic state) and 54V (planar state).

Experimental Example 5-3

Chiral material CB15 (7.91 parts by weight) (available from Merck Ltd., Japan), 7.91 parts by weight of MLC6248 (available from Merck Ltd., Japan), 18.08 parts by weight of R811 (available from Merck Ltd., Japan) were added to and mixed with a mixture of 46.27 parts by weight of nematic liquid crystal ZLI1565 (Δε7.0; available from Merck Ltd., Japan) and 19.83 parts by weight of nematic liquid crystal E44 (Δε16.8; available from Merck Ltd., Japan) to give Chiral nematic liquid crystal O. The ratio of two kinds of the nematic liquid crystals was approximately 7:3.

The Chiral nematic liquid crystal O showed cholesteric phase and peak reflection wavelength at around 470 nm.

A liquid crystal display device was produced up to the process of formation of the absorbing film of black color in a manner similar to Experimental Example 1-1 except that Chiral nematic liquid crystal O was used.

Device properties of Chiral nematic liquid crystal O were measured to give the results as below (applied pulse width: 5 nm).

Black Y value: 5.0 (driving voltage: 48 V), colored Y value: 9.2 (driving voltage: 61 V), peak reflectance: 42.1%.

The Chiral nematic liquid crystal O had anisotropy of dielectric constant Δε of 11.5 and showed temperature shift of peak reflection wavelength of 1.0 nm from 25° C. to 60° C., being equal to almost no shift.

As clearly shown in comparison with Experimental Example 5-1, when the ratio of ZLI1565 and E44 was set to 7:3 from 1:1, the value Δε of the liquid crystal composition became lower to be 11.5 and the driving voltage became higher to be 48V (focal conic state) and 61V (planar state).

Experimental Example 6-1

Chiral material CB15 (4.72 parts by weight) (available from Merck Ltd., Japan), 4.72 parts by weight of MLC6248 (available from Merck Ltd., Japan), 14.17 parts by weight of R811 (available from Merck Ltd., Japan) were added to and mixed with a mixture of 38.19 parts by weight of nematic liquid crystal ZLI1565 (Δε7.0; available from Merck Ltd., Japan) and 38.19 parts by weight of nematic liquid crystal E44 (Δε16.8; available from Merck Ltd., Japan) to give Chiral nematic liquid crystal P. The ratio of two kinds of the nematic liquid crystals was approximately 1:1.

The Chiral nematic liquid crystal P showed cholesteric phase and peak reflection wavelength at around 670 nm.

A liquid crystal display device was produced up to the process of formation of the absorbing film of black color in a manner similar to Experimental Example 1-1 except that Chiral nematic liquid crystal P was used.

Device properties of Chiral nematic liquid crystal P were measured to give the results as below (applied pulse width: 5 nm).

Black Y value: 5.9 (driving voltage: 25 V), colored Y value: 9.0 (driving voltage: 42V), peak reflectance: 36.0%.

The Chiral nematic liquid crystal P had anisotropy of dielectric constant Δε of 13 and showed temperature shift of peak reflection wavelength of 1.5 nm from 25° C. to 60° C., being equal to almost no shift.

Experimental Example 6-2

Chiral material CB15 (5.51 parts by weight) (available from Merck Ltd., Japan), 5.51 parts by weight of MLC6248 (available from Merck Ltd., Japan), 12.6 parts by weight of R811 (available from Merck Ltd., Japan) were added to and mixed with a mixture of 22.91 parts by weight of nematic liquid crystal ZLI1565 (Δε7.0; available from Merck Ltd., Japan) and 53.46 parts by weight of nematic liquid crystal E44 (Δε16.8; available from Merck Ltd., Japan) to give Chiral nematic liquid crystal Q. The ratio of two kinds of the nematic liquid crystals was approximately 3:7.

The Chiral nematic liquid crystal Q showed cholesteric phase and peak reflection wavelength at around 670 nm.

A liquid crystal display device was produced up to the process of formation of the absorbing film of black color in a manner similar to Experimental Example 1-1 except that Chiral nematic liquid crystal Q was used.

Device properties of Chiral nematic liquid crystal Q were measured to give the results as below (applied pulse width: 5 nm).

Black Y value: 6.1 (driving voltage: 21 V), colored Y value: 9.4 (driving voltage: 38 V), peak reflectance: 36.1%.

The Chiral nematic liquid crystal Q had anisotropy of dielectric constant Δε of 14 and showed temperature shift of peak reflection wavelength of 2.0 nm from 25° C. to 60° C., being equal to almost no shift.

As clearly shown in comparison with Experimental Example 6-1, when the ratio of ZLI1565 and E44 was set to 3:7 from 1:1, the value Δε of the liquid crystal composition became higher to be 14 and the driving voltage became lower to be 21V (focal conic state) and 38V (planar state).

Experimental Example 6-3

Chiral material CB15 (5.51 parts by weight) (available from Merck Ltd., Japan), 5.51 parts by weight of MLC6248 (available from Merck Ltd., Japan), 12.6 parts by weight of R811 (available from Merck Ltd., Japan) were added to and mixed with a mixture of 53.46 parts by weight of nematic liquid crystal ZLI1565 (Δε7.0; available from Merck Ltd., Japan) and 22.91 parts by weight of nematic liquid crystal E44 (Δε16.8; available from Merck Ltd., Japan) to give Chiral nematic liquid crystal R. The ratio of two kinds of the nematic liquid crystals was approximately 7:3.

The Chiral nematic liquid crystal R showed cholesteric phase and peak reflection wavelength at around 670 nm.

A liquid crystal display device was produced up to the process of formation of the absorbing film of black color in a manner similar to Experimental Example 1-1 except that Chiral nematic liquid crystal R was used.

Device properties of Chiral nematic liquid crystal R were measured to give the results as below (applied pulse width: 5 nm).

Black Y value: 5.7 (driving voltage: 28 V), colored Y value: 8.7 (driving voltage: 45 V), peak reflectance: 35.7%.

The Chiral nematic liquid crystal R had anisotropy of dielectric constant Δε of 12.2 and showed temperature shift of peak reflection wavelength of 1.0 nm from 25° C. to 60° C., being equal to almost no shift.

As clearly shown in comparison with Experimental Example 6-1, when the ratio of ZLI1565 and E44 was set to 7:3 from 1:1, the value Δε of the liquid crystal composition became lower to be 12.2 and the driving voltage became higher to be 28V (focal conic state) and 45V (planar state).

Experimental Example 7-1

Chiral material CB15 (6.0 parts by weight) (available from Merck Ltd., Japan), 6.2 parts by weight of the chiral compound represented by the formula (1) below, 14.3 parts by weight of R811 (available from Merck Ltd., Japan) were added to and mixed with 73.5 parts by weight of nematic liquid crystal (anisotropy of dielectric constant Δε: 12, anisotropy of refractive index Δn: 0.17, isotropic phase transition temperature $T_{NI}$: 96° C.) to give Chiral nematic liquid crystal S. The ratio of two kinds of CB15 and the chiral material of the formula (1) as the first chiral material was approximately 1:1.

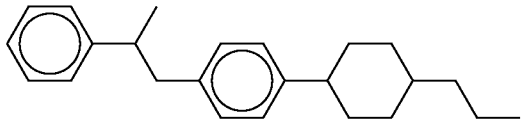

(1)

The Chiral nematic liquid crystal S showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal S was used.

Device properties of Chiral nematic liquid crystal S were measured to give the results as below (applied pulse width: 5 nm).

Black Y value: 6.0 (driving voltage: 38 V), colored Y value: 21.5 (driving voltage: 53 V), peak reflectance: 36.8%.

The Chiral nematic liquid crystal S had anisotropy of dielectric constant Δε of 10.0 and showed temperature shift of peak reflection wavelength of 1.5 nm from 25° C. to 60° C., being equal to almost no shift.

Experimental Example 7-2

Chiral material CB15 (10.2 parts by weight) (available from Merck Ltd., Japan), 4.4 parts by weight of the chiral compound represented by the formula (1) above, 14.8 parts by weight of R811 (available from Merck Ltd., Japan) were added to and mixed with 70.6 parts by weight of nematic liquid crystal (Δε: 12, Δn: 0.17, $T_{NI}$: 96° C.) to give Chiral nematic liquid crystal T. The ratio of two kinds of CB15 and the chiral material of the formula (1) as the first chiral material was approximately 7:3.

The Chiral nematic liquid crystal T showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal T was used.

Device properties of Chiral nematic liquid crystal T were measured to give the results as below (applied pulse width: 5 nm).

Black Y value: 6.2 (driving voltage: 35 V), colored Y value: 21.3 (driving voltage: 50 V), peak reflectance: 36.5%.

The Chiral nematic liquid crystal T had anisotropy of dielectric constant Δε of 11.2 and showed temperature shift of peak reflection wavelength of 2.1 nm from 25° C. to 60° C., being equal to almost no shift.

Experimental Example 7-3

Chiral material CB15 (4.3 parts by weight) (available from Merck Ltd., Japan), 10.0 parts by weight of the chiral compound represented by the formula (1) above, 14.0 parts by weight of R811 (available from Merck Ltd., Japan) were added to and mixed with 71.7 parts by weight of nematic liquid crystal (Δε: 12, Δn: 0.17, $T_{NI}$: 96° C.) to give Chiral nematic liquid crystal U. The ratio of two kinds of CB15 and the chiral material of the formula (1) as the first chiral material was approximately 3:7.

The Chiral nematic liquid crystal U showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal U was used.

Device properties of Chiral nematic liquid crystal U were measured to give the results as below (applied pulse width: 5 nm).

Black Y value: 6.0 (driving voltage: 40 V), colored Y value: 21.4 (driving voltage: 55 V), peak reflectance: 36.5%.

The Chiral nematic liquid crystal U had anisotropy of dielectric constant Δε of 9.2 and showed temperature shift of peak reflection wavelength of 2.8 nm from 25° C. to 60° C., being equal to almost no shift.

Experimental Example 8-1

Chiral material CB15 (5.4 parts by weight) (available from Merck Ltd., Japan), 5.4 parts by weight of the chiral compound represented by the formula (1) above and 16.4 parts by weight of R811 (available from Merck Ltd., Japan) were added to and mixed with a mixture of 35.0 parts by weight of nematic liquid crystal (anisotropy of dielectric constant Δε: 12, anisotropy of refractive index Δn: 0.17, isotropic phase transition temperature $T_{NI}$: 96° C.) and 35.0 parts by weight of nematic liquid crystal (Δε: 22, Δn: 0.22, $T_{NI}$: 100° C.) to give Chiral nematic liquid crystal V. The ratio of two kinds of the nematic liquid crystals was approximately 1:1.

The Chiral nematic liquid crystal V showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal V was used.

Device properties of Chiral nematic liquid crystal V were measured to give the results as below (applied pulse width: 5 nm).

Black Y value: 6.2 (driving voltage: 31 V), colored Y value: 24.0 (driving voltage: 43V), peak reflectance: 39.2%.

The Chiral nematic liquid crystal V had anisotropy of dielectric constant Δε of 15.0 and showed temperature shift of peak reflection wavelength of 2.6 nm from 25° C. to 60° C., being equal to almost no shift.

Experimental Example 8-2

Chiral material CB15 (6.1 parts by weight) (available from Merck Ltd., Japan), 6.1 parts by weight of the chiral compound represented by the formula (1) above and 16.7 parts by weight of R811 (available from Merck Ltd., Japan) were added to and mixed with a mixture of 21.0 parts by weight of nematic liquid crystal (Δε: 12, Δn: 0.17, $T_{NI}$: 96° C.) and 49.0 parts by weight of nematic liquid crystal (Δε: 22, Δn: 0.22, $T_{NI}$: 100° C.) to give Chiral nematic liquid crystal W. The ratio of two kinds of the nematic liquid crystals was approximately 3:7.

The Chiral nematic liquid crystal W showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal W was used.

Device properties of Chiral nematic liquid crystal W were measured to give the results as below (applied pulse width: 5 nm).

Black Y value: 6.0 (driving voltage: 27 V), colored Y value: 24.6 (driving voltage: 39V), peak reflectance: 39.6%.

The Chiral nematic liquid crystal W had anisotropy of dielectric constant Δε of 16.8 and showed temperature shift of peak reflection wavelength of 1.8 nm from 25° C. to 60° C., being equal to almost no shift.

Experimental Example 8-3

Chiral material CB15 (6.4 parts by weight) (available from Merck Ltd., Japan), 6.4 parts by weight of the chiral compound represented by the formula (1) above and 17.0 parts by weight of R811 (available from Merck Ltd., Japan) were added to and mixed with a mixture of 49.0 parts by weight of nematic liquid crystal (Δε: 12, Δn: 0.17, $T_{NI}$: 96° C.) and 21.0 parts by weight of nematic liquid crystal (Δε: 22, Δn: 0.22, $T_{NI}$: 100° C.) to give Chiral nematic liquid crystal X. The ratio of two kinds of the nematic liquid crystals was approximately 7:3.

The Chiral nematic liquid crystal X showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal X was used.

Device properties of Chiral nematic liquid crystal X were measured to give the results as below (applied pulse width: 5 nm).

Black Y value: 5.8 (driving voltage: 35 V), colored Y value: 23.8 (driving voltage: 47V), peak reflectance: 39.0%.

The Chiral nematic liquid crystal X had anisotropy of dielectric constant Δε of 13.7 and showed temperature shift of peak reflection wavelength of 2.8 nm from 25° C. to 60° C., being equal to almost no shift.

Experimental Example 9-1

The chiral compound represented by the formula (2) below (6.0 parts by weight), 6.3 parts by weight of chiral material MLC6248 (available from Merck Ltd., Japan), 13.9 parts by weight of R811 (available from Merck Ltd., Japan) were added to and mixed with 73.8 parts by weight of nematic liquid crystal (Δε: 12, Δn: 0.17, $T_{NI}$: 96° C.) to give Chiral nematic liquid crystal AA. The ratio of two kinds of the chiral material of the formula (2) and MLC6248 as the first chiral material was approximately 1:1.

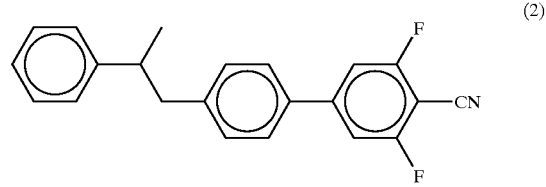

(2)

The Chiral nematic liquid crystal AA showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AA was used.

Device properties of Chiral nematic liquid crystal AA were measured to give the results as below (applied pulse width: 5 nm).

Black Y value: 6.2 (driving voltage: 37 V), colored Y value: 21.8 (driving voltage: 52 V), peak reflectance: 36.7%.

The Chiral nematic liquid crystal AA had anisotropy of dielectric constant Δε of 10.3 and showed temperature shift of peak reflection wavelength of 2 nm from 25° C. to 60° C., being equal to almost no shift.

Experimental Example 9-2

The chiral compound represented by the formula (2) above (9.8 parts by weight), 4.2 parts by weight of chiral material MLC6248 (available from Merck Ltd., Japan), 14.4 parts by weight of R811 (available from Merck Ltd., Japan) were added to and mixed with 71.6 parts by weight of nematic liquid crystal ($\Delta\epsilon$: 12, $\Delta$n: 0.17, $T_{NI}$: 96° C.) to give Chiral nematic liquid crystal AB. The ratio of two kinds of the chiral material of the formula (2) and MLC6248 as the first chiral material was approximately 7:3.

The Chiral nematic liquid crystal AB showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AB was used.

Device properties of Chiral nematic liquid crystal AB were measured to give the results as below (applied pulse width: 5 nm).

Black Y value: 6.4 (driving voltage: 34 V), colored Y value: 21.3 (driving voltage: 49 V), peak reflectance: 36.5%.

The Chiral nematic liquid crystal AB had anisotropy of dielectric constant $\Delta\epsilon$ of 11.7 and showed temperature shift of peak reflection wavelength of 1.8 nm from 25° C. to 60° C., being equal to almost no shift.

Experimental Example 9-3

The chiral compound represented by the formula (2) above (4.3 parts by weight), 10.0 parts by weight of chiral material MLC6248 (available from Merck Ltd., Japan), 14.0 parts by weight of R811 (available from Merck Ltd., Japan) were added to and mixed with 71.7 parts by weight of nematic liquid crystal ($\Delta\epsilon$: 12, $\Delta$n: 0.17, $T_{NI}$: 96° C.) to give Chiral nematic liquid crystal AC. The ratio of two kinds of the chiral material of the formula (2) and MLC6248 as the first chiral material was approximately 3:7.

The Chiral nematic liquid crystal AC showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AC was used.

Device properties of Chiral nematic liquid crystal AC were measured to give the results as below (applied pulse width: 5 nm).

Black Y value: 6.0 (driving voltage: 40 V), colored Y value: 21.5 (driving voltage: 54 V), peak reflectance: 36.4%.

The Chiral nematic liquid crystal AC had anisotropy of dielectric constant $\Delta\epsilon$ of 9.0 and showed temperature shift of peak reflection wavelength of 2.1 nm from 25° C. to 60° C., being equal to almost no shift.

Experimental Example 10-1

The chiral compound represented by the formula (2) above (5.6 parts by weight), 5.6 parts by weight of chiral material MLC6248 (available from Merck Ltd., Japan), 16.4 parts by weight of R811 (available from Merck Ltd., Japan) were added to and mixed with a mixture of 36.2 parts by weight of nematic liquid crystal ($\Delta\epsilon$: 12, $\Delta$n: 0.17, $T_{NI}$: 96° C.) and 36.2 parts by weight of nematic liquid crystal ($\Delta\epsilon$: 22, $\Delta$n: 0.22, $T_{NI}$: 100° C.) to give Chiral nematic liquid crystal AD. The ratio of two kinds of the nematic liquid crystals was approximately 1:1.

The Chiral nematic liquid crystal AD showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AD was used.

Device properties of Chiral nematic liquid crystal AD were measured to give the results as below (applied pulse width: 5 nm).

Black Y value: 6.3 (driving voltage: 30 V), colored Y value: 23.9 (driving voltage: 42V), peak reflectance: 39.3%.

The Chiral nematic liquid crystal AD had anisotropy of dielectric constant $\Delta\epsilon$ of 15.5 and showed temperature shift of peak reflection wavelength of 1.5 nm from 25° C. to 60° C., being equal to almost no shift.

Experimental Example 10-2

The chiral compound represented by the formula (2) above (6.0 parts by weight), 6.0 parts by weight of chiral material MLC6248 (available from Merck Ltd., Japan), 16.8 parts by weight of R811 (available from Merck Ltd., Japan) were added to and mixed with a mixture of 21.4 parts by weight of nematic liquid crystal ($\Delta\epsilon$: 12, $\Delta$n: 0.17, $T_{NI}$: 96° C.) and 49.8 parts by weight of nematic liquid crystal ($\Delta\epsilon$: 22, $\Delta$n: 0.22, $T_{NI}$: 100° C.) to give Chiral nematic liquid crystal AE. The ratio of two kinds of the nematic liquid crystals was approximately 3:7.

The Chiral nematic liquid crystal AE showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AE was used.

Device properties of Chiral nematic liquid crystal AE were measured to give the results as below (applied pulse width: 5 nm).

Black Y value: 6.1 (driving voltage: 26 V), colored Y value: 24.4 (driving voltage: 38V), peak reflectance: 39.7%.

The Chiral nematic liquid crystal AE had anisotropy of dielectric constant $\Delta\epsilon$ of 16.9 and showed temperature shift of peak reflection wavelength of 2.5 nm from 25° C. to 60° C., being equal to almost no shift.

Experimental Example 10-3

The chiral compound represented by the formula (2) above (5.9 parts by weight), 5.9 parts by weight of chiral material MLC6248 (available from Merck Ltd., Japan), 16.6 parts by weight of R811 (available from Merck Ltd., Japan) were added to and mixed with a mixture of 50.1 parts by weight of nematic liquid crystal ($\Delta\epsilon$: 12, $\Delta$n: 0.17, $T_{NI}$: 96° C.) and 21.5 parts by weight of nematic liquid crystal ($\Delta\epsilon$: 22, $\Delta$n: 0.22, $T_{NI}$: 100° C.) to give Chiral nematic liquid crystal AF.

The ratio of two kinds of the nematic liquid crystals was approximately 7:3.

The Chiral nematic liquid crystal AF showed cholesteric phase and peak reflection wavelength at around 540 nm.

A liquid crystal display device was produced up to the process of formation of the absorbing film of black color in a manner similar to Experimental Example 1-1 except that Chiral nematic liquid crystal AF was used.

Device properties of Chiral nematic liquid crystal AF were measured to give the results as below (applied pulse width: 5 nm).

Black Y value: 5.9 (driving voltage: 34 V), colored Y value: 23.6 (driving voltage: 46V), peak reflectance: 39.1%.

The Chiral nematic liquid crystal AF had anisotropy of dielectric constant Δε of 13.9 and showed temperature shift of peak reflection wavelength of 2.2 nm from 25° C. to 60° C., being equal to almost no shift.

TABLE 1

|  | Liquid crystal (addition amount (parts by weight)) | | First chiral material (addition amount (parts by weight)) | Second chiral material (addition amount (parts by weight)) | | Chiral material weight ratio | Liquid crystal weight ratio (liquid crystal 1: | |
| --- | --- | --- | --- | --- | --- | --- | --- | --- |
|  | liquid crystal 1 | liquid crystal 2 | chiral A | chiral B | chiral C | (chiral A:chiral B) | liquid crystal 2) | Δε |
| Experimental Example 1-1 | ZLI1565 (70.4) | none | CB15 (7.0) | MLC6248 (7.6) | R811 (15.0) | 1:1 | — | 4.3 |
| Experimental Example 1-2 | ZLI1565 (69.3) | none | CB15 (10.4) | MLC6248 (4.5) | R811 (15.8) | 7:3 | — | 5.4 |
| Experimental Example 1-3 | ZLI1565 (71.4) | none | CB15 (4.3) | MLC6248 (10.1) | R811 (14.2) | 3:7 | — | 4.0 |
| Experimental Example 2-1 | ZLI1565 (35) | E44 (35) | CB15 (6) | MLC6248 (6) | R811 (18) | 1:1 | 1:1 | 12.8 |
| Experimental Example 2-2 | ZLI1565 (21) | E44 (49) | CB15 (7) | MLC6248 (7) | R811 (16) | 1:1 | 3:7 | 13.8 |
| Experimental Example 2-3 | ZLI1565 (49) | E44 (21) | CB15 (7) | MLC6248 (7) | R811 (16) | 1:1 | 7:3 | 12.0 |

TABLE 2

|  | Liquid crystal (addition amount (parts by weight)) | | First chiral material (addition amount (parts by weight)) | Second chiral material (addition amount (parts by weight)) | | Chiral material weight ratio | Liquid crystal weight ratio (liquid crystal 1: | |
| --- | --- | --- | --- | --- | --- | --- | --- | --- |
|  | liquid crystal 1 | liquid crystal 2 | chiral A | chiral B | chiral C | (chiral A:chiral B) | liquid crystal 2) | Δε |
| Experimental Example 3-1 | ZLI1565 (66.5) | none | CB15 (7.9) | MLC6248 (8.6) | R811 (17) | 1:1 | — | 4.0 |
| Experimental Example 3-2 | ZLI1565 (65.21) | none | CB15 (11.8) | MLC6248 (5.09) | R811 (17.9) | 7:3 | — | 5.1 |
| Experimental Example 3-3 | ZLI1565 (67.7) | none | CB15 (4.9) | MLC6248 (11.4) | R811 (16.0) | 3:7 | — | 3.7 |
| Experimental Example 4-1 | ZLI1565 (76.7) | none | CB15 (5.5) | MLC6248 (6.0) | R811 (11.8) | 1:1 | — | 4.6 |
| Experimental Example 4-2 | ZLI1565 (75.9) | none | CB15 (8.2) | MLC6248 (3.5) | R811 (12.4) | 7:3 | — | 5.7 |
| Experimental Example 4-3 | ZLI1565 (77.4) | none | CB15 (3.4) | MLC6248 (8.0) | R811 (11.2) | 3:7 | — | 4.3 |

TABLE 3

|  | Liquid crystal (addition amount (parts by weight)) | | First chiral material (addition amount (parts by weight)) | Second chiral material (addition amount (parts by weight)) | | Chiral material weight ratio | Liquid crystal weight ratio (liquid crystal 1: | |
| --- | --- | --- | --- | --- | --- | --- | --- | --- |
|  | liquid crystal 1 | liquid crystal 2 | chiral A | chiral B | chiral C | (chiral A:chiral B) | liquid crystal 2) | Δε |
| Experimental Example 5-1 | ZLI1565 (33.05) | E44 (33.05) | CB15 (6.78) | MLC6248 (6.78) | R811 (20.34) | 1:1 | 1:1 | 12.3 |
| Experimental Example 5-2 | ZLI1565 (19.83) | E44 (46.27) | CB15 (7.91) | MLC6248 (7.91) | R811 (18.08) | 1:1 | 3:7 | 13.3 |
| Experimental Example 5-3 | ZLI1565 (46.27) | E44 (19.83) | CB15 (7.91) | MLC6248 (7.91) | R811 (18.08) | 1:1 | 7:3 | 11.5 |
| Experimental Example 6-1 | ZLI1565 (38.19) | E44 (38.19) | CB15 (4.72) | MLC6248 (4.72) | R811 (14.17) | 1:1 | 1:1 | 13 |
| Experimental Example 6-2 | ZLI1565 (22.91) | E44 (53.46) | CB15 (5.51) | MLC6248 (5.51) | R811 (12.6) | 1:1 | 3:7 | 14 |
| Experimental Example 6-3 | ZLI1565 (53.46) | E44 (22.91) | CB15 (5.51) | MLC6248 (5.51) | R811 (12.6) | 1:1 | 7:3 | 12.2 |

TABLE 4

| | Liquid crystal (addition amount (parts by weight)) | | First chiral material (addition amount (parts by weight)) | | Second chiral material (addition amount (parts by weight)) | Chiral material weight ratio | Liquid crystal weight ratio (liquid crystal 1: | |
|---|---|---|---|---|---|---|---|---|
| | liquid crystal 1 | liquid crystal 2 | chiral A | chiral B | chiral C | (chiral A:chiral B) | liquid crystal 2) | $\Delta\epsilon$ |
| Experimental Example 7-1 | liquid crystal a (73.5) | none | CB15 (6) | formula (1) (6.2) | R811 (14.3) | 1:1 | — | 10.0 |
| Experimental Example 7-2 | liquid crystal a (70.6) | none | CB15 (10.2) | formula (1) (4.4) | R811 (14.8) | 7:3 | — | 11.2 |
| Experimental Example 7-3 | liquid crystal a (71.7) | none | CB15 (4.3) | formula (1) (10.0) | R811 (14.0) | 3.7 | — | 9.2 |
| Experimental Example 8-1 | liquid crystal a (35.0) | liquid crystal b (35.0) | CB15 (5.4) | formula (1) (5.4) | R811 (16.4) | 1:1 | 1:1 | 15.0 |
| Experimental Example 8-2 | liquid crystal a (21.0) | liquid crystal b (49.0) | CB15 (6.1) | formula (1) (6.1) | R811 (16.7) | 1:1 | 3:7 | 16.8 |
| Experimental Example 8-3 | liquid crystal a (49.0) | liquid crystal b (21.0) | CB15 (6.4) | formula (1) (6.4) | R811 (17.0) | 1:1 | 7:3 | 13.7 | liquid crystal a: nematic liquid crystal ($\Delta\epsilon$ 12, $\Delta$n 0.17, $T_{NI}$ 96° C.); liquid crystal b: nematic liquid crystal ($\Delta\epsilon$ 22, $\Delta$n 0.22, $T_{NI}$ 100° C.)

TABLE 5

| | Liquid crystal (addition amount (parts by weight)) | | First chiral material (addition amount (parts by weight)) | | Second chiral material (addition amount (parts by weight)) | Chiral material weight ratio | Liquid crystal weight ratio (liquid crystal 1: | |
|---|---|---|---|---|---|---|---|---|
| | liquid crystal 1 | liquid crystal 2 | chiral A | chiral B | chiral C | (chiral A:chiral B) | liquid crystal 2) | $\Delta\epsilon$ |
| Experimental Example 9-1 | liquid crystal c (73.8) | none | formula (2) (6.0) | MLC6248 (6.3) | R811 (13.9) | 1:1 | — | 10.3 |
| Experimental Example 9-2 | liquid crystal c (71.6) | none | formula (2) (9.8) | MLC6248 (4.2) | R811 (14.4) | 7:3 | — | 11.7 |
| Experimental Example 9-3 | liquid crystal c (71.7) | none | formula (2) (4.3) | MLC6248 (10.0) | R811 (14.0) | 3:7 | — | 9 |
| Experimental Example 10-1 | liquid crystal c (36.2) | liquid crystal d (36.2) | formula (2) (5.6) | MLC6248 (5.6) | R811 (16.4) | 1:1 | 1:1 | 15.5 |
| Experimental Example 10-2 | liquid crystal c (21.4) | liquid crystal d (49.8) | formula (2) (6.0) | MLC6248 (6.0) | R811 (16.8) | 1:1 | 3:7 | 16.9 |
| Experimental Example 10-3 | liquid crystal c (50.1) | liquid crystal d (21.5) | formula (2) (5.9) | MLC6248 (5.9) | R811 (16.6) | 1:1 | 7:3 | 13.9 | liquid crystal C: nematic liquid crystal ($\Delta\epsilon$ 12, $\Delta$n 0.17, $T_{NI}$ 96° C.)
liquid crystal d: nematic liquid crystal ($\Delta\epsilon$ 22, $\Delta$n 0.17, $T_{NI}$ 100° C.)

According to the present invention, shift of selective reflection wavelength depending on change of ambient temperature can be controlled effectively. The present invention provides a chiral nematic liquid crystal composition with anisotropy of dielectric constant adjusted to a desired value and a liquid crystal display device using thereof. In addition to the effects above, driving power supply of each liquid crystal display device can be easily made common and the production const can be reduced accordingly in a stacked liquid crystal display device of the present invention.

What is claimed is:

1. A preparation method of a chiral nematic liquid crystal composition which shows cholesteric phase at room temperature and is able to reflect light in visible region selectively, the composition containing at least a nematic liquid crystal material, a first chiral material with shift direction of selective reflection wavelength toward long wavelength direction depending on temperature and a second chiral material with shift direction of selective reflection wavelength toward short wavelength direction depending on temperature, wherein, to set anisotropy of dielectric constant of whole chiral nematic liquid crystal composition to a predetermined value, at least one chiral material between the first chiral material and the second chiral material comprises two or more chiral compounds and a mixing ratio of the two or more chiral compounds is controlled, and/or the nematic liquid crystal material comprises two or more kinds of nematic liquid crystal compounds and a mixing ratio of the two or more nematic liquid crystal compounds is controlled.

2. A preparation method of claim 1, characterized in that the anisotropy of dielectric constant of whole chiral nematic liquid crystal composition can be adjusted in a range of 0.5 or more.

3. A preparation method of claim 1, in which the anisotropy of dielectric constant of whole liquid crystal composition is controlled within such a range as total content of the chiral materials is 5% by weight or less to total weight of whole chiral nematic liquid crystal composition.

4. A preparation method of claim 1, in which the nematic liquid crystal materials, the first chiral material and second chiral material are mixed and the resultant mixture was purified in contact with at least one of an ion-exchange resin and an absorbent.

5. A preparation method of a chiral nematic liquid crystal composition which shows cholesteric phase at room temperature and is able to reflect light in visible region selectively, comprising the steps of:

mixing at least a nematic liquid crystal material, a first chiral material with shift direction of selective reflection wavelength toward long wavelength direction depending on temperature and a second chiral material with shift direction of selective reflection wavelength toward short wavelength direction depending on temperature thereby preparing a first chiral nematic liquid crystal composition having first anisotropy of dielectric constant, and mixing at least the nematic liquid crystal material, the first chiral material and the second chiral material thereby preparing a second chiral nematic liquid crystal composition having second anisotropy of dielectric constant different from the first anisotropy of dielectric constant, wherein (1) at least one chiral material between the first chiral material and the second chiral material comprises two or more chiral compounds and a mixing ratio of the two or more chiral compounds is different between in the first chiral nematic liquid crystal composition and in the second chiral material liquid crystal composition, and/or (2) the nematic liquid crystal material comprises two or more kinds of nematic liquid crystal mixtures and a mixing ratio of the two or more nematic liquid crystal mixtures is different between in the first chiral nematic liquid crystal composition and in the second chiral material liquid crystal composition.

6. A chiral nematic liquid crystal composition which shows cholesteric phase at room temperature and is able to reflect light in visible region selectively, comprising:

a nematic liquid crystal material;

a first chiral material with shift direction of selective reflection wavelength toward long wavelength direction depending on temperature;

and a second chiral material with shift direction of selective reflection wavelength toward short wavelength direction depending on temperature;

wherein at least one chiral material between the first chiral material and the second chiral material comprises two or more chiral compounds.

7. A chiral nematic liquid crystal composition of claim 6, in which each of the two or more chiral compounds expresses different anisotropy of dielectric constant each other when each chiral compound is added to the nematic liquid crystal materials separately.

8. A chiral nematic liquid crystal composition of claim 7, in which the two or more chiral compounds comprises a chiral compound having a polar group and a chiral compound not having a polar group.

9. A chiral nematic liquid crystal composition of claim 6, in which the two or more chiral compounds have same helical sense.

10. A chiral nematic liquid crystal composition of claim 6, in which total content of the first chiral material and the second chiral material is in a range of 3–40% by weight to total amount of the nematic liquid crystal, the first chiral material and the second chiral material.

11. A chiral nematic liquid crystal composition of claim 6, in which an amount ratio of the first chiral material and the second chiral material is in a range of 1:9–9:1.

12. A chiral nematic liquid crystal composition of claim 6, in which the nematic liquid crystal material comprises two or more nematic liquid crystal compounds different each other in anisotropy of dielectric constant.

13. A chiral nematic liquid crystal composition of claim 6, in which the nematic liquid crystal material has positive anisotropy of dielectric constant.

14. A liquid crystal display device, comprising:

a pair of substrats; and a chiral nematic liquid crystal composition of claim 6 which is disposed between the pair of substrates.

15. A liquid crystal display device of claim 14, wherein said chiral nematic liquid crystal composition is capable of keeping a displaying state without voltage application.

16. A layered-type liquid crystal display device, comprising:

a plurality of liquid crystal layers;

wherein at least two liquid crystal layers comprises liquid crystal compositions of claim 6 and the liquid crystal compositions are different each other in mixing ratio of the two or more chiral compounds.

17. A layered-type liquid crystal display device of claim 16, wherein the plurality of liquid crystal layers comprises at least two liquid crystal layers each having, as the nematic liquid crystal material, at least two kinds of nematic liquid crystal mixtures, and wherein mixing ratios of the at least two kinds of nematic liquid crystal mixtures of the at least two liquid crystal layers are different each other.

18. A layered-type liquid crystal display device of claim 16, wherein each liquid crystal layer has selective reflection wavelength.

19. A layered-type liquid crystal display device of claim 16, wherein the difference of anisotropy of dielectric constant among liquid crystal compositions contained in at least two liquid crystal layers is 0.5 or more each other.

20. A layered-type liquid crystal display device of claim 16, wherein each ratio of total amount of the first chiral material and second chiral material to total weight of each liquid crystal composition is within 5% by weight or less difference.

* * * * *